United States Patent
DiChiara

(10) Patent No.: US 11,524,467 B2
(45) Date of Patent: *Dec. 13, 2022

(54) INDUCTION WELDING USING A HEAT SINK AND/OR COOLING

(71) Applicant: The Boeing Company, Chicago, IL (US)

(72) Inventor: Robert A. DiChiara, Carlsbad, CA (US)

(73) Assignee: The Boeing Company, Chicago, IL (US)

( * ) Notice: Subject to any disclaimer, the term of this patent is extended or adjusted under 35 U.S.C. 154(b) by 433 days.

This patent is subject to a terminal disclaimer.

(21) Appl. No.: 16/532,943

(22) Filed: Aug. 6, 2019

(65) Prior Publication Data

US 2021/0039334 A1 Feb. 11, 2021

(51) Int. Cl.
*B29C 65/00* (2006.01)
*B29C 65/36* (2006.01)

(52) U.S. Cl.
CPC ...... *B29C 66/9121* (2013.01); *B29C 65/3672* (2013.01); *B29C 66/721* (2013.01); *B29C 66/73921* (2013.01)

(58) Field of Classification Search
CPC .............. B29C 65/3672; B29C 66/721; B29C 66/73921; B29C 66/9121; B29C 66/91311; B29C 66/91651
See application file for complete search history.

(56) References Cited

U.S. PATENT DOCUMENTS

| | | | |
|---|---|---|---|
| 2,834,395 A | 5/1958 | Russell et al. | |
| 3,480,505 A | 11/1969 | Donnell, Jr. et al. | |
| 3,860,778 A | 1/1975 | Rudd et al. | |
| 4,197,149 A | 4/1980 | Freitag et al. | |
| 4,810,563 A | 3/1989 | Gree | |
| 4,992,133 A * | 2/1991 | Border .................... | B29C 65/18 156/498 |
| 5,240,542 A * | 8/1993 | Miller .................. | B29C 66/348 156/272.4 |
| 5,266,764 A | 11/1993 | Fox et al. | |

(Continued)

FOREIGN PATENT DOCUMENTS

| | | | | |
|---|---|---|---|---|
| DE | 102012100620 A1 | 7/2013 | | |
| GB | 2566476 A * | 3/2019 | ............. | B29C 65/32 |

(Continued)

OTHER PUBLICATIONS

Available at: https://www.engineeringtoolbox.com/specific-heat-solids-d_154.html. Engineering ToolBox, (2003). Specific Heat of Solids. [Accessed Aug. 25, 2021].

(Continued)

*Primary Examiner* — George R Koch
(74) *Attorney, Agent, or Firm* — Yee & Associates, P.C.

(57) ABSTRACT

A method of dissipating heat from a surface of a first thermoplastic composite (TPC) being inductively welded with a second thermoplastic composite (TPC) includes flexing a heat sink during placement to conform to the surface of the first TPC, cooling the heat sink, applying inductive heat to a weld interface area between the first TPC and the second TPC, and drawing off heat via the heat sink from the surface of the first TPC.

34 Claims, 21 Drawing Sheets

(56) References Cited

U.S. PATENT DOCUMENTS

| | | | |
|---|---|---|---|
| 5,641,422 A | 6/1997 | Matsen et al. | |
| 5,660,917 A | 8/1997 | Fujimori et al. | |
| 5,723,849 A | 3/1998 | Matsen et al. | |
| 5,760,379 A | 6/1998 | Matsen et al. | |
| 5,847,375 A | 12/1998 | Matsen et al. | |
| 5,902,935 A | 5/1999 | Georgeson et al. | |
| 5,920,457 A | 7/1999 | Lamb et al. | |
| 6,039,114 A | 3/2000 | Becker et al. | |
| 6,091,063 A | 7/2000 | Woods | |
| 6,367,541 B2 | 4/2002 | McCullough | |
| 6,549,411 B1 | 4/2003 | Herbert | |
| 6,919,504 B2 | 7/2005 | McCutcheon et al. | |
| 7,077,858 B2 | 7/2006 | Fletcher et al. | |
| 7,147,041 B2 | 12/2006 | Mitchell et al. | |
| 7,297,399 B2 | 11/2007 | Zhang et al. | |
| 8,668,802 B2 | 3/2014 | Van Wijngaarden | |
| 9,375,345 B2 | 6/2016 | Levinson et al. | |
| 9,527,237 B2 | 12/2016 | Benson et al. | |
| 9,553,038 B2 | 1/2017 | Koontz et al. | |
| 9,586,362 B2 | 3/2017 | Matsen et al. | |
| 10,458,717 B2 | 10/2019 | Davis et al. | |
| 10,549,482 B2 | 2/2020 | Pupovac et al. | |
| 10,712,102 B2 | 7/2020 | Takken et al. | |
| 11,058,030 B2 | 7/2021 | Tian et al. | |
| 11,230,066 B2* | 1/2022 | DiChiara | B29C 66/3494 |
| 11,292,204 B2* | 4/2022 | DiChiara | B29C 65/3616 |
| 2002/0157785 A1 | 10/2002 | Anderson et al. | |
| 2004/0200550 A1 | 10/2004 | Pfaffmann et al. | |
| 2005/0061473 A1 | 3/2005 | Fletcher et al. | |
| 2005/0077601 A1 | 4/2005 | Yu et al. | |
| 2007/0091570 A1 | 4/2007 | Campbell et al. | |
| 2009/0311506 A1* | 12/2009 | Herbeck | B29C 70/386 428/297.4 |
| 2010/0208431 A1 | 8/2010 | Dugas et al. | |
| 2012/0063098 A1 | 3/2012 | Paquette et al. | |
| 2012/0080785 A1 | 4/2012 | Johnson et al. | |
| 2014/0190629 A1* | 7/2014 | Benson | B29C 65/1403 156/272.2 |
| 2015/0144617 A1 | 5/2015 | Challita et al. | |
| 2016/0278856 A1 | 9/2016 | Panescu et al. | |
| 2016/0289984 A1 | 10/2016 | Wagner | |
| 2017/0198714 A1 | 7/2017 | Lin et al. | |
| 2017/0203497 A1 | 7/2017 | Matsen et al. | |
| 2017/0321096 A1 | 11/2017 | Fraivillig | |
| 2018/0147800 A1 | 5/2018 | Zhu et al. | |
| 2018/0250888 A1 | 8/2018 | Mach | |
| 2018/0259271 A1 | 9/2018 | Wu | |
| 2019/0096785 A1 | 3/2019 | Walczyk et al. | |
| 2020/0086583 A1* | 3/2020 | Rhodes, Jr. | B29C 66/81455 |
| 2020/0271395 A1 | 8/2020 | Grinham et al. | |
| 2020/0276769 A1* | 9/2020 | Van Ingen | B29C 66/54 |
| 2021/0039326 A1* | 2/2021 | DiChiara | B29C 66/81871 |
| 2021/0039327 A1* | 2/2021 | DiChiara | B29C 66/81461 |
| 2021/0039328 A1* | 2/2021 | DiChiara | B29C 66/81871 |
| 2021/0039329 A1* | 2/2021 | DiChiara | B29C 66/91411 |
| 2021/0039332 A1* | 2/2021 | DiChiara | B29C 65/364 |
| 2021/0039333 A1* | 2/2021 | DiChiara | B29C 66/349 |
| 2021/0039334 A1 | 2/2021 | DiChiara | |

FOREIGN PATENT DOCUMENTS

| | | |
|---|---|---|
| GB | 2566476 A | 3/2019 |
| JP | 6430732 A | 3/2019 |

OTHER PUBLICATIONS

DOW. "DOWSIL 3145 RTV MIL-A-46146 Adhesive/Sealant—Gray," Wep page <https://www.dow.com/documents/en-us/productdatasheet/11/11-18/11-1832-01-dowsil-3145-rtv-mil-a-46146-adhesive-gray.pdf>, 5 pages, retrieved from Internet on Aug. 25, 2021.

Induction Welding, https://en.wikipedia.org/wiki/Induction_welding/, accessed Apr. 22, 2019.

Fiber Optic Linear Heat Detection, safefiredetection.com/products/fiber-optic-linear-heat-detection/, accessed May 10, 2019.

"Properties Alumiunium Nitride", Jan. 22, 2021 (Jan. 22, 2021), XP055768077, Retrieved from the Internet: URL: https://www.memsnet.org/material/alumi numnitridealnbulk/ (retrieved on Jan. 22, 2021).

Piddock et al: "Effect of alumina concentration on the thermal diffusivity of dental porcelain", Journal of Dentistry, Elsevier, Amsterdam, NL, vol. 17, No. 6, Dec. 1, 1989 (Dec. 1, 1989), pp. 290-294, XP023108306, ISSN: 0300-5712, DOI:10.1016/0300-5712(89)90042-0.

EP, Extended Search Report, Application No. 20185945.1-1014, pp. 2-4, dated Feb. 2, 2021.

Epo, Extended Search Report, Application No. 20188368.3-1014 dated Dec. 7, 2020.

* cited by examiner

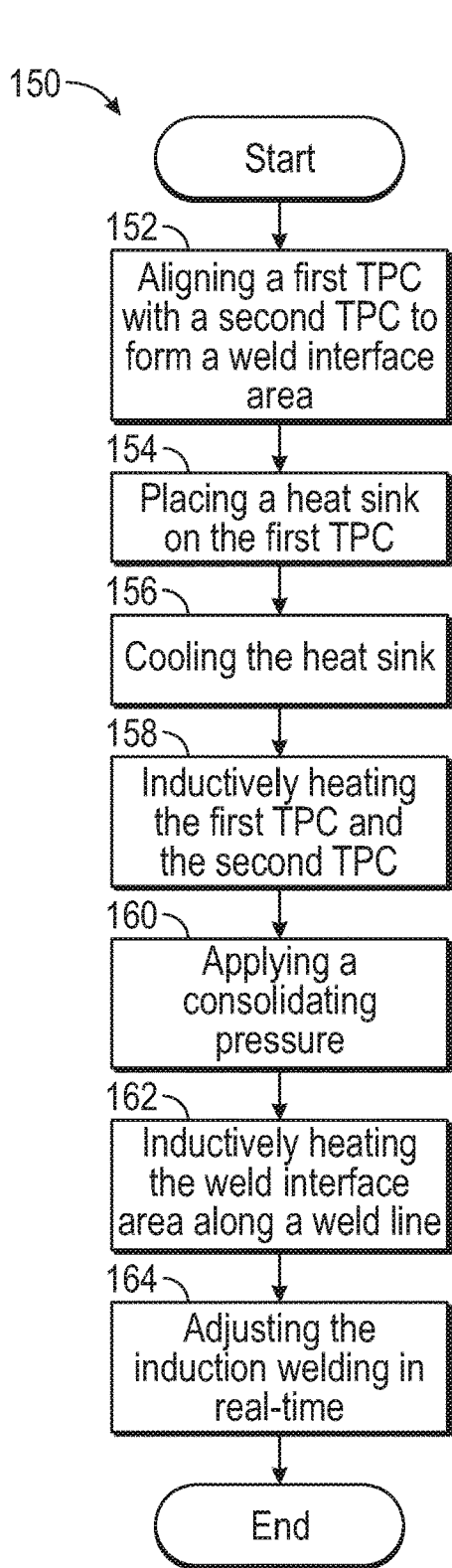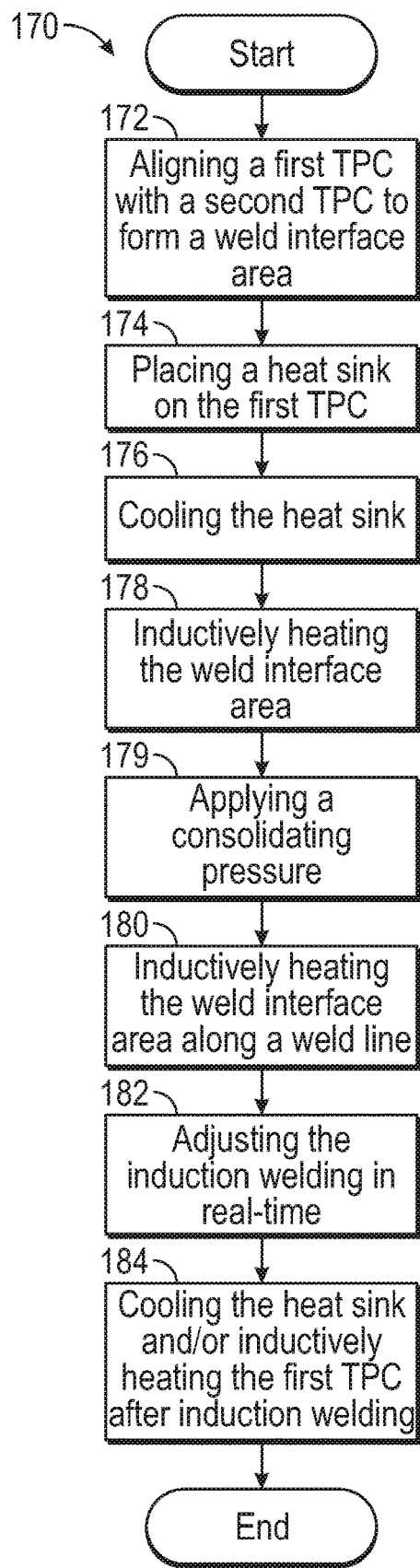
FIG. 17
FIG. 18

INDUCTION WELDING USING A HEAT SINK AND/OR COOLING

INTRODUCTION

The present disclosure relates to induction welding. More specifically, the present disclosure relates to induction welding of thermoplastic composites using a flexible heat sink and/or cooling to reduce temperatures away from the weld interface.

BACKGROUND

Induction welding may be used to fuse or join thermoplastic composite (TPC) parts together. TPC parts generally include a thermoplastic which are reinforced with non-plastic materials, such as carbon fibers. TPC parts offer high damage tolerance as well as moisture and chemical resistance and do not degrade in hot or wet conditions. Moreover, TPC parts can be re-melted, providing benefits in repair and end-of-life recyclability as well as reduced handling and storage costs when compared to other alternatives.

Induction welding involves moving an induction coil along a weld line of the TPC parts. The induction coil induces eddy currents in the inherently conductive carbon fibers disposed within the TPC parts, which generate heat and melt the thermoplastic with the intention to particularly melt the thermoplastic at the weld interface. Compression of the TPC parts together creates a fusion bond or weld joint. Induction welding produces a weld joint that is considered to be one solid piece such that two or more parts become one part.

While induction welding is effective, the induction coil generates heat throughout the TPC parts and not just at the weld joint. For example, heating is higher in the portions of the TPC parts closer to the induction coil than at the weld joint. Thus, there is a need in the art for systems and method of induction welding TPC parts that concentrate heating at the weld joint.

SUMMARY

In one example, a method of dissipating heat from a surface of a first thermoplastic composite (TPC) being inductively welded with a second thermoplastic composite (TPC) is provided. The method includes flexing a heat sink during placement to conform to the surface of the first TPC, cooling the heat sink, applying inductive heat to a weld interface area between the first TPC and the second TPC, and drawing off heat via the heat sink from the surface of the first TPC.

In another example, a system for induction welding a first thermoplastic composite (TPC) to a second thermoplastic composite (TPC) is provided. The system includes a heat sink disposed on the first TPC, the heat sink having a number of tiles flexibly joined together by a joint, an induction coil disposed above the heat sink and moveable relative to a weld interface area in a first direction to form a weld at the weld interface area between the first TPC with the second TPC, and a cooling apparatus disposed above the heat sink for cooling the heat sink, the cooling apparatus disposed adjacent the induction coil in the first direction, the cooling apparatus moveable in the first direction to cool the heat sink prior to forming the weld.

In another example, a method of dissipating heat from a surface of a first thermoplastic composite (TPC) being inductively welded with a second thermoplastic composite (TPC) is provided. The method includes flexing a heat sink to conform to the surface of the first TPC, cooling the heat sink before inductively heating, applying inductive heat to a weld interface area between the first TPC and the second TPC, drawing off heat via the heat sink from the surface of the first TPC, and cooling the heat sink after inductively heating.

The features, functions, and advantages that have been discussed may be achieved independently in various aspects or may be combined in other aspects further details of which can be seen with reference to the following description and drawings.

BRIEF DESCRIPTION OF THE DRAWINGS

The drawings described herein are for illustration purposes only and are not intended to limit the scope of the present disclosure in any way.

FIG. 17 is an exemplary process flow diagram of induction welding, according to an exemplary aspect;

FIG. 18 is another exemplary process flow diagram of induction welding, according to an exemplary aspect;

DETAILED DESCRIPTION

The following description is merely exemplary in nature and is not intended to limit the present disclosure, application, or uses.

Figure 1:
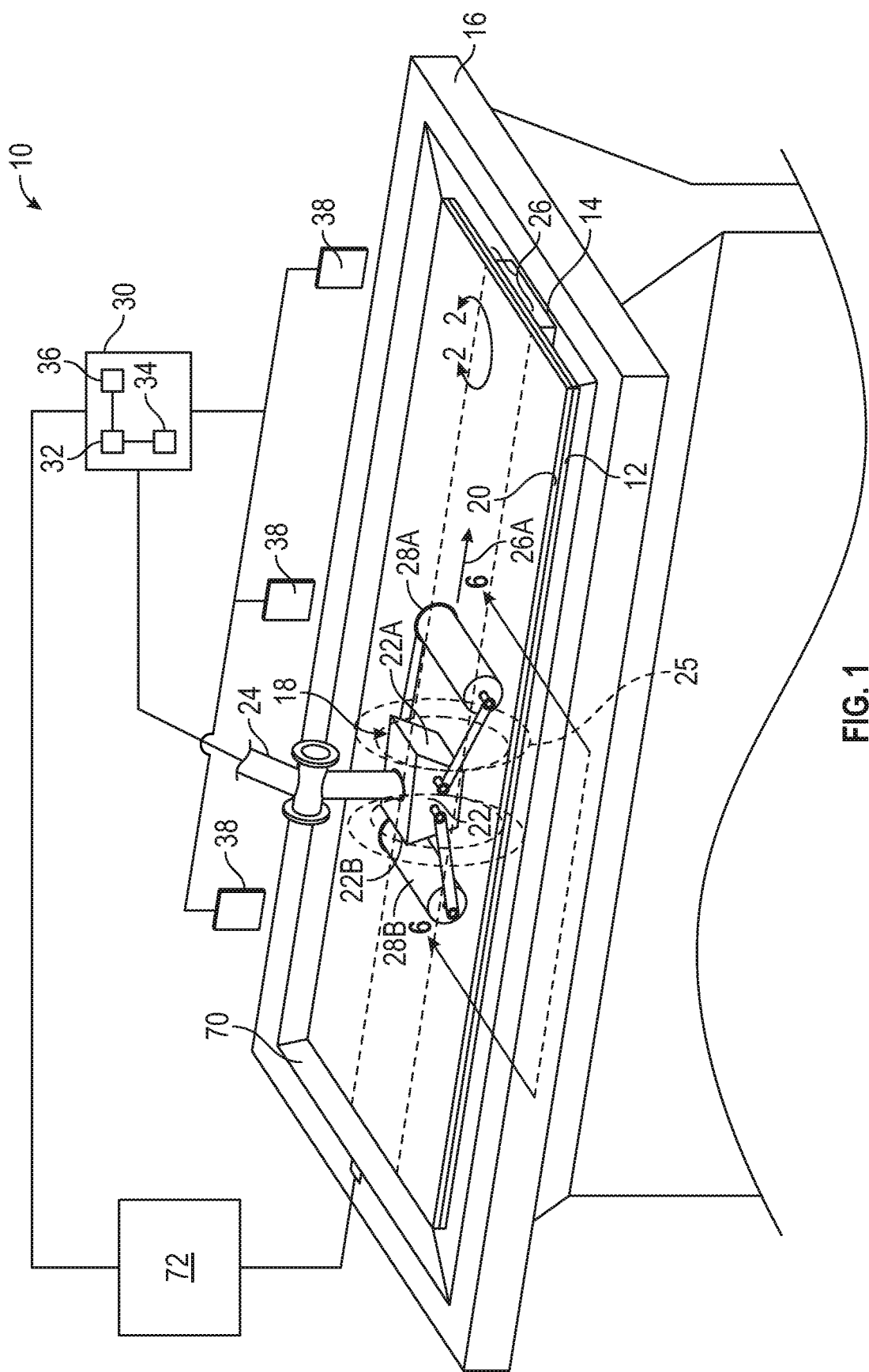
FIG. 1 is a perspective view of a system for induction welding, according to an exemplary aspect.

Referring to FIG. 1, a schematic diagram of a system 10 for induction welding a first thermoplastic composite (TPC) 12 to a second TPC 14 is shown. The system 10 may be employed in the context of aircraft manufacturing and service, as will be described below. For example, the system 10 may be used in component and subassembly manufacturing of an aircraft including interior fabrication, acoustic panels, system integration of the aircraft, airframe fabrication, and routine maintenance and service of the aircraft. However, the system 10 may be used in various other industries, including automotive, construction, sporting goods, and general transportation industry, to name but a few. The first TPC 12 and the second TPC 14 are illustrated as flat sheets. However, it should be appreciated that the first TPC 12 and the second TPC 14 may be contoured, curved, or otherwise non-planar, without departing from the scope of the present disclosure, as described in relation to FIG. 2 below. Moreover, the first TPC 12 and the second TPC 14 may be comprised of various thermoplastics reinforced with various electrically conductive materials. In one example, the thermoplastics are selected from the group consisting of semi-crystalline thermoplastics and amorphous thermoplastics. The semi-crystalline thermoplastics may include polyphenylene sulfide (PPS), polyetheretherketone (PEEK), polyetherketoneketone (PEKK) and polyarylketone (PAEK). The amorphous thermoplastics may include polyetherimide (PEI). The semi-crystalline thermoplastic have high consolidation temperatures with good mechanical properties relative to conventional thermoplastics. The amorphous thermoplastics exhibit a gradual softening on heating with the material having good elongation, toughness and impact resistance properties relative to conventional thermoplastics. Semi-crystalline thermoplastics contain areas of tightly folded chains (crystallites) that are connected together and exhibit a sharp melting point on heating when the crystalline regions start dissolving. As the polymer approaches its melting point, the crystalline lattice breaks down and the molecules are free to rotate and translate. During slow cooling, the semi-crystalline thermoplastic nucleate and grow crystalline regions which provides increased strength, stiffness, solvent resistance and temperature stability relative to an amorphous structure. If a semi-crystalline thermoplastic is cooled too quickly it may form an amorphous structure.

In another example, the electrically conductive materials include carbon fibers. The carbon fibers may be oriented within the thermoplastic in various configurations (not shown), which in turn affects the degree of heating during induction welding. For example, the carbon fibers may be oriented in a cross-hatch pattern at 0 and 90 degrees, +/−45 degrees, or +/−60 degrees, to name but a few. The carbon fibers may be unidirectional or weaved together. Each such configuration impacts the degree of heating in the first TPC 12 and the second TPC 14 under a given magnetic field. It should be appreciated that while two TPC parts are illustrated, any number of stacked TPC parts may be employed.

The system 10 generally includes a tooling base 16, an induction welder 18, and a heat sink 20. The tooling base 16 supports the first TPC 12 and the second TPC 14 thereon. In the example provided, the tooling base 16 is flat. However, it should be appreciated that the tooling base 16 may have various other shapes to support the first TPC 12 and the second TPC 14.

The induction welder 18 is configured to inductively heat the first TPC 12 and the second TPC 14 and may take various forms without departing from the scope of the present disclosure. In the example provided, the induction welder 18 includes an induction coil 22 mounted to a robotic arm 24. The induction coil 22 may also be mounted to any other suitable robotic manipulator. In another aspect, the induction coil 22 may be fixed and the first TPC 12 and the second TPC 14 are moved relative to the induction coil 22. Thus, the induction coil 22 may move relative to the first TPC 12 and the second TPC 14 and the first TPC 12 and the second TPC 14 may be moved relative to the induction coil 22. In another example, both the induction coil 22 and the first TPC 12 and the second TPC 14 may move. The induction coil 22 generates a magnetic field 25 to induce eddy currents in the carbon fibers of the first TPC 12 and the second TPC 14. The robotic arm 24 moves the induction coil 22 along a weld line 26 in a first direction 26A. Thus, the weld line 26 is an area of the first TPC 12 and the second TPC 14 that is to be welded together. The weld line 26 may be straight or curved or any other pattern. A first roller 28A and a second roller 28B are disposed adjacent the induction coil 22. The first roller 28A is disposed on a forward side 22A of the induction coil 22. The second roller 28B is disposed on an aft side 22B of the induction coil 22. The first roller 28A and the second roller 28B apply consolidating pressure onto the first TPC 12 and the second TPC 14 during the induction welding process, as will be described below. In the example provided, the first roller 28A and the second roller 28B are connected to the induction coil 22, though it should be appreciated that the first roller 28A and the second roller 28B may be separate without departing from the scope of the present disclosure. The first roller 28A and the second roller 28B may be hinged to allow the first roller 28A and the second roller 28B to move over contoured surfaces while maintaining consolidating pressure onto the first TPC 12. In addition, consolidating pressure may be applied during or after induction welding when the induction coil 22 is moved in the first direction 26A or in an opposite direction. In addition, other methods may be employed to apply the consolidating pressure as described below with reference to FIG. 1A.

The induction welder 18 is in electrical communication with a controller 30. The controller 30 is operable to control an amount of current supplied to the induction coil 22 which in turn controls the strength of the magnetic field and thus the heating of the first TPC 12 and the second TPC 14. The controller 30 is also operable to control movement of the robotic arm 24 or the induction coil 22 relative to the weld line 26. The controller 30 is a non-generalized, electronic control device having a preprogrammed digital computer or processor 32, memory or non-transitory computer readable medium 34 used to store data such as control logic, software applications, instructions, computer code, data, lookup tables, etc., and input/output ports 36. The non-transitory computer readable medium 34 includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code. The processor 32 is configured to execute the code or instructions.

The system 10 may further include a number of sensors 38 in electronic communication with the controller 30. The sensors 38 are configured to detect or sense conditions of the first TPC 12 and/or the second TPC 14 during the induction welding in order to provide real-time feedback to the controller 30. For example, the sensors 38 may be infra-red temperatures sensors configured to detect a temperature of the first TPC 12 and/or the second TPC 14. Alternatively, or in addition, the sensors 38 may be electromagnetic field sensors configured to detect a strength of the magnetic field 25 generated by the induction coil 22. The sensors 38 may be used by the controller 30 in feedback control of movement of the induction coil 22, as will be described below.

Figure 1A:
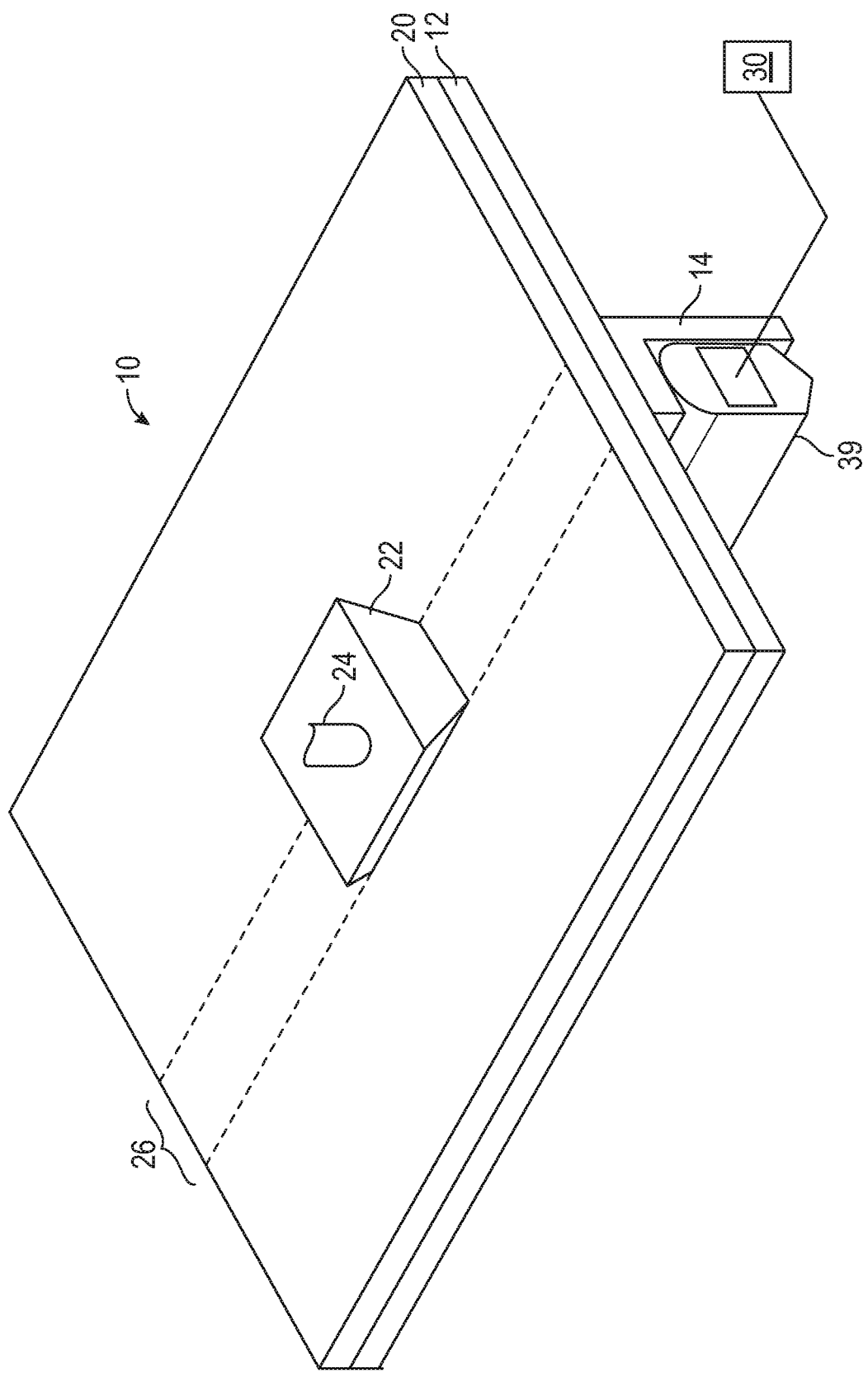
FIG. 1A is a perspective view of a variation of the system for induction welding, according to an exemplary aspect.

FIG. 1A shows an alternate arrangement of the system 10 according to the principles of the present disclosure. The arrangement shown in FIG. 1A is similar to that shown in FIG. 1, however, the rollers 28A and 28B have been removed and the second TPC 14 is illustrated as having an "L" shaped cross-section. Other possible cross-sections for the second TPC 14, and/or the first TPC 12, include at least "J", "I", "T", "Z" and/or "Hat" cross-sections. Consolidating pressure is supplied by a bellows 39 disposed along the weld line 26 below the second TPC 14. Expansion of the bellows 39 to exert a consolidating pressure onto the second TPC 14 may be controlled by the controller 30.

Figure 2A:
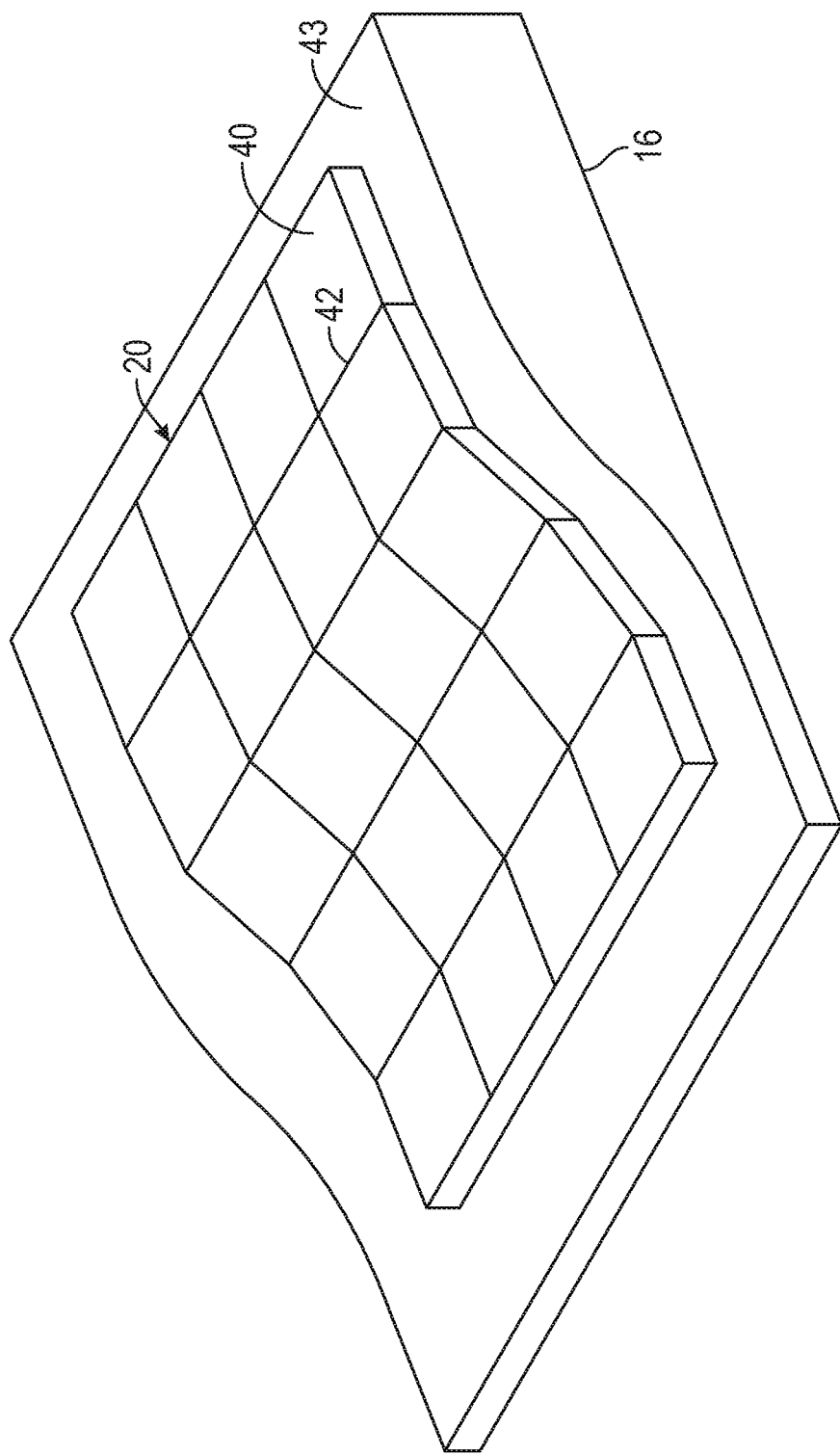
FIG. 2A is a perspective view of the heat sink shown on an exemplary curved surface, according to an exemplary aspect.
Figure 2:
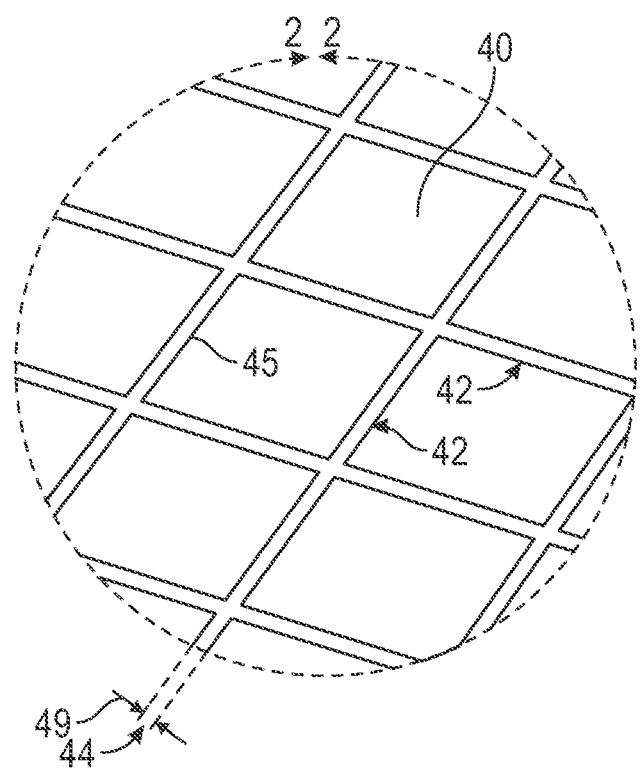
FIG. 2 is an enlarged portion of a heat sink indicated by arrows 2-2 in FIG. 1, according to an exemplary aspect.

Returning to FIG. 1, the heat sink 20 is configured to absorb and dissipate heat from the first TPC 12. The heat sink 20 is disposed between the first TPC 12 and the induction coil 22, as will be described below. FIG. 2 shows an enlarged portion of the heat sink 20 of FIG. 1. Referring to FIG. 2, the heat sink 20 includes a number of tiles 40 connected by a joint 42. The joint 42 is disposed between the tiles 40. The tiles 40 are made from an electrically non-conductive and thermally conductive material. Thus, when under the induction coil 22 (FIG. 1), the tiles 40 are not heated by the magnetic field 25 but absorb heat from the first TPC 12. In one example, the tiles 40 have a thermal diffusivity of greater than about 25 mm$^2$/sec and preferably greater than about 70 mm$^2$/sec. In this context, the term "about" is known to those skilled in the art. Alternatively, the term "about" may be read to mean plus or minus 5 mm$^2$/sec. In another example, the tiles 40 have a thermal conductivity of greater than about 75 W/mK and preferably greater than about 150 W/mK. In this context, the term "about" is known to those skilled in the art. Alternatively, the term "about" may be read to mean plus or minus 10 W/mK. In another example, the tiles 40 have a specific heat capacity of greater than about 500 J/K/kg and preferably greater than about 700 J/K/kg. In this context, the term "about" is known to those skilled in the art. Alternatively, the term "about" may be read to mean plus or minus 50 J/K/kg. In one example, the tiles 40 are comprised of Aluminum Nitride. The Aluminum Nitride has a low residual carbon in the material matrix to assure that during induction welding of the first TPC 12 that the induction coil 22 does not couple with the carbon in the tiles 40 and inadvertently heat the tiles 40. In another example, the tiles 40 are comprised of Beryllium Oxide. In another example, the tiles 40 are comprised of Cubic Boron Nitride (c-BN) or Hexagonal Boron Nitride (h-BN).

The joint 42 flexibly holds the tiles 40 together and provides flexibility to the heat sink 20, thus allowing the heat sink 20 to conform to the contours of the first TPC 12. For example, FIG. 2A illustrates the heat sink 20 on a contoured surface 43 of the first TPC 12. In the example provided, the contoured surface 43 is curved. The heat sink 20 pivots at the joints 42 to maintain contact between the tiles 40 and the contoured surface 43. The joint 42 may be comprised of either a flexible adhesive 45, shown in FIGS. 2 and 2A, or a mechanical hinge 47, shown in FIG. 5. With reference to FIG. 2, the flexible adhesive 45 provides flexibility to the heat sink 20 and does not melt during heating of the tiles 40 during induction welding. A minimum amount of flexible adhesive 45 is preferably used to hold the tiles 40 together, thus increasing the heat dissipation capacity of the heat sink 20. Accordingly, in one example, the flexible adhesive 45 has a long-term degradation temperature greater than about 570 degrees Fahrenheit in air. In this context, the term "about" is known to those skilled in the art. Alternatively, the term "about" may be read to mean plus or minus 25 degrees Fahrenheit. In another example, the flexible adhesive 45 has an elongation of between 120% and 670%. In another example, the flexible adhesive 45 has a tensile strength of between 690 psi to 1035 psi. In another example, the flexible adhesive 45 has a tear strength (Die B) of between 31 lb/in to 190 lb/in. Accordingly, in one example, the flexible adhesive 45 is comprised of a silicone. An example of a suitable silicone is 3145 RTV by Dow Corning. However, other silicones may be employed.

The tiles 40 are arranged in a single layer as a parquet or geometric pattern. Thus, each of the tiles 40 define a gap 44 therebetween and the joint 42 is disposed within the gap 44. The tiles 40 are arranged, sized and shaped to help facilitate conformance to a contour of the contoured surface 43 (FIG. 2A) of the first TPC 12. In one example, the gap 44 has a width 49 between about 0.005 inches to about 0.1 inches and preferably about 0.040 inches. In this context, the term "about" is known to those skilled in the art. Alternatively, the term "about" may be read to mean plus or minus 0.005 inches. While the tiles 40 are illustrated as squares, which maximize a surface area of the tiles 40 relative to the joint 42, the tiles 40 may have various other shapes without departing from the scope of the present disclosure. For example, the tiles 40 may have straight or curved edges and have three or more sides to help conform to a contour of the first TPC 12 and/or the shape of the weld. The heat sink 20 is sized to preferably at least cover the weld line 26 (FIG. 1) or, as in the present example, the entire first TPC 12 (FIG. 1).

Figure 3:
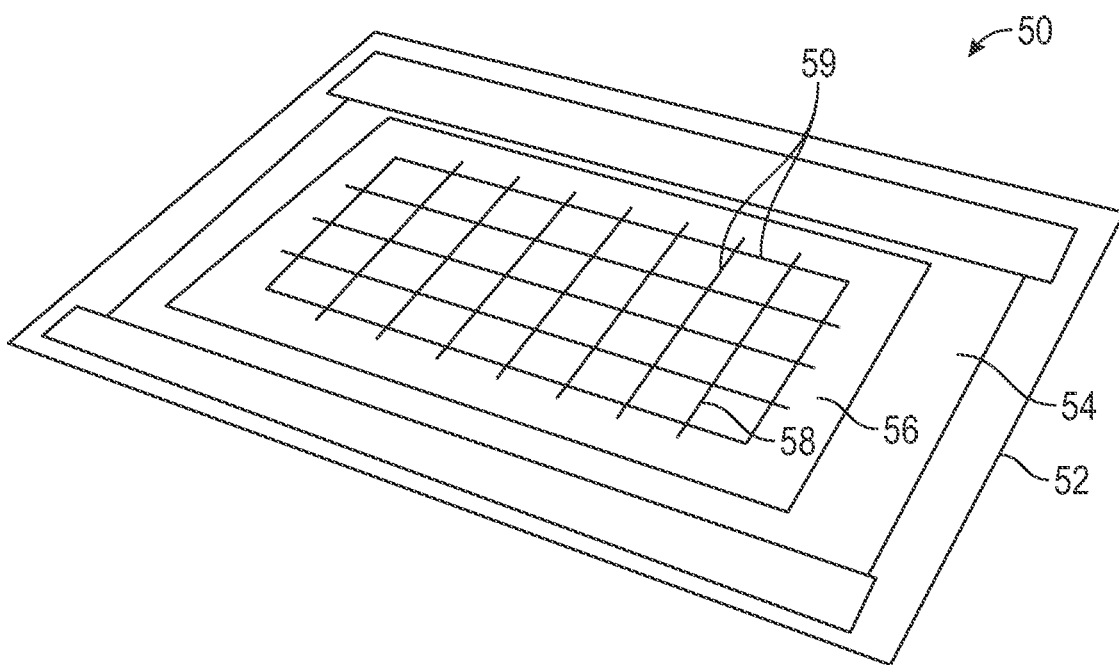
FIG. 3 is a perspective view of a heat sink fabrication system used to fabricate the heat sink of FIG. 2, according to an exemplary aspect.

FIG. 3 shows a heat sink fabrication system 50 used to fabricate the heat sink 20 (FIG. 2). The heat sink fabrication system 50 includes a base plate 52 that supports an backing material 54. In one example, the backing material 54 is a double-sided tape that adheres to the base plate 52. In another example, the backing material 54 is a glass cloth tape. In yet another example, the backing material 54 is a Teflon coated fiberglass sprayed with an adhesive having a bottom layer of glass cloth. In this configuration, curing occurs on both sides of the backing material 54. A frame 56 having a jig 58 is disposed on the backing material 54. In one aspect, the jig 58 is comprised of individual wires 59 weaved together. The jig 58 is sized to create the gaps 44 (FIG. 2) in the heat sink 20. The frame 56 and the jig 58 is removable from the backing material 54.

Figure 4:
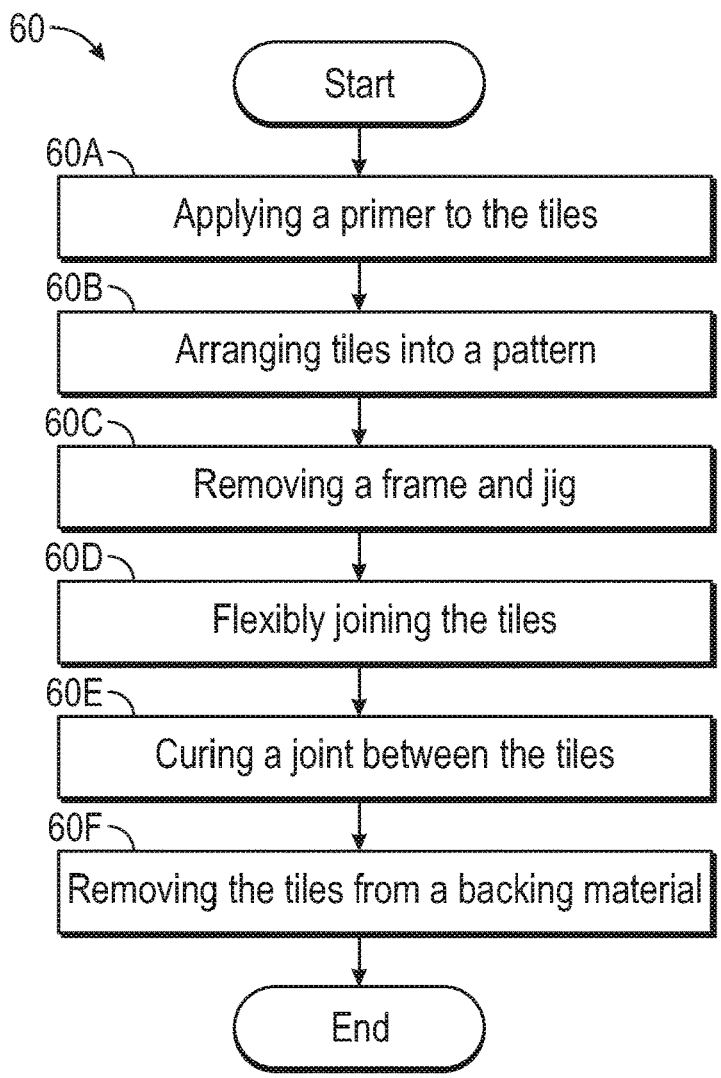
FIG. 4 is an exemplary process flow diagram illustrating a method of fabricating the heat sink of FIG. 2 using the heat sink fabrication system of FIG. 3, according to an exemplary aspect.

FIG. 4 shows a flow chart of a method 60 for creating the heat sink 20 of FIG. 2 using the heat sink fabrication system 50 of FIG. 3. The method 60 begins at block 60A where the tiles 40 may be primed by a primer prior to arrangement onto the backing material 54. In one example, the primer is a silicone primer. At block 60B the tiles 40 are arranged into a pattern within the jig 58. For example, the tiles 40 are placed onto the backing material 54 between the jig 58. The backing material 54 holds the tiles 40 in place while the jig 58 spaces the tiles 40. Thus, the pattern is defined by the jig 58. At block 60B Once the tiles 40 have been placed, the frame 56 and the jig 58 are removed at block 60C thus leaving the gaps 44 between the tiles 40.

Next, at block 60D, the tiles 40 are flexibly joined together with the joint 42. In the example provided, the joint 42 is applied within the gaps 44 between the tiles 40. At block 60E the joint 42 is then preferably cured over a period of time. Once cured, the assembled heat sink 20 may be removed from the backing material 54 at block 60F.

Figure 5:
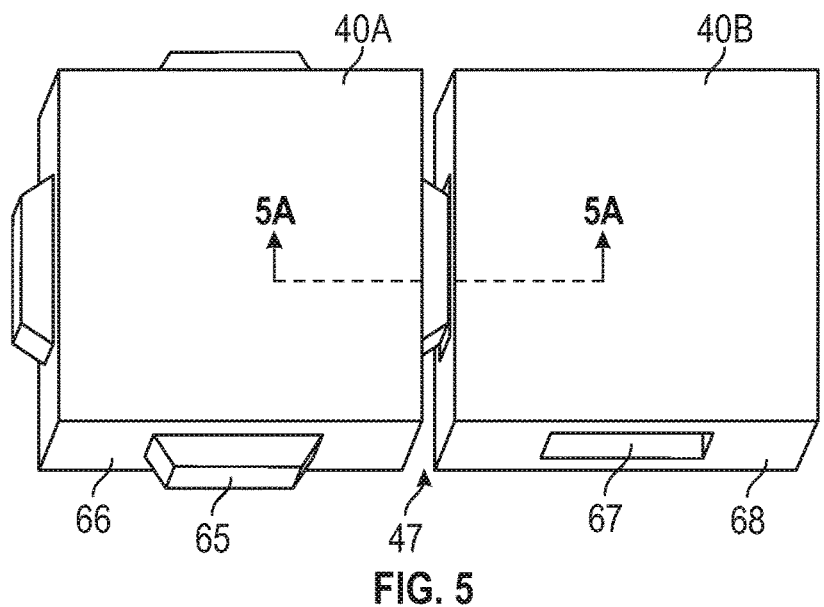
FIG. 5 is an exemplary perspective view of a portion of a heat sink having a mechanical hinge, according to an exemplary aspect.

FIG. 5 shows a portion of the heat sink 20 employing an example of the mechanical hinge 47 flexibly connecting the tiles 40. A first tile 40A includes tabs 65 that extend out from a number of sides 66 of the first tile 40A. The tabs 65 may be integrally formed with the first tile 40A or bonded to the first tile 40A. An adjacent, second tile 40B includes slots 67 disposed in a number of sides 68 of the second tile 40B. It should be appreciated that, as described above, the first tile 40A and the second tile 40B may have three or more sides without departing from the scope of the present disclosure.

Figure 5A:
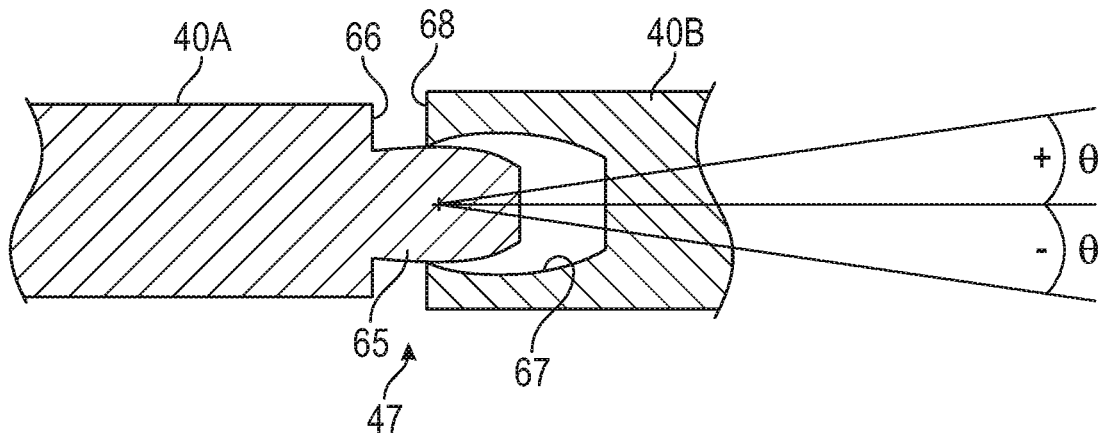
FIG. 5A is a cross-section of the heat sink viewed in the direction of arrow 5A-5A in FIG. 5, according to an exemplary aspect.

With reference to FIG. 5A, the first tile 40A is connected to the second tile 40B by inserting the tab 65 within the slot 67. The tab 65 and the slot 67 are configured to allow the first tile 40A to pivot with respect to the second tile 40B. For example, the first tile 40A may pivot with respect to the second tile 40B by $+/-\theta$ degrees. In one example, the flexible adhesive 45 (FIG. 2) may be disposed within the mechanical hinge 47. The tiles 40A, 40B are arranged in a single layer to form a parquet pattern. The heat sink 20 may thus be fabricated to any size or shape by alternatively connecting a number of first tiles 40A to a number of second tiles 40B.

Returning to FIG. 1, the system 10 may further include a vacuum bag 70. The vacuum bag 70 is connected to a vacuum source 72. The vacuum source 72 is configured to apply a vacuum to the vacuum bag 70. The vacuum source 72 is preferably controlled by the controller 30. The first TPC 12, the second TPC 14, and the heat sink 20 are all disposed within the vacuum bag 70. By removing air from the vacuum bag 70, the flexible adhesive 45 of the joint 42 (FIG. 2) of the heat sink 20 is able to withstand temperatures before degrading higher than in an environment with air/oxygen. Alternatively, the vacuum source 72 may be replaced with a pump (not shown) that fills the vacuum bag 70 with an inert gas, such as Nitrogen. The inert gas displaces the air within the vacuum bag 70 and also allows the flexible adhesive 45 of the joint 42 (FIG. 2) of the heat sink 20 to withstand temperatures before degrading higher than an environment with air/oxygen. The vacuum bag 70 is also configured to apply consolidating pressure onto the first TPC 12 and the second TPC 14 via vacuum compression.

Figure 6:
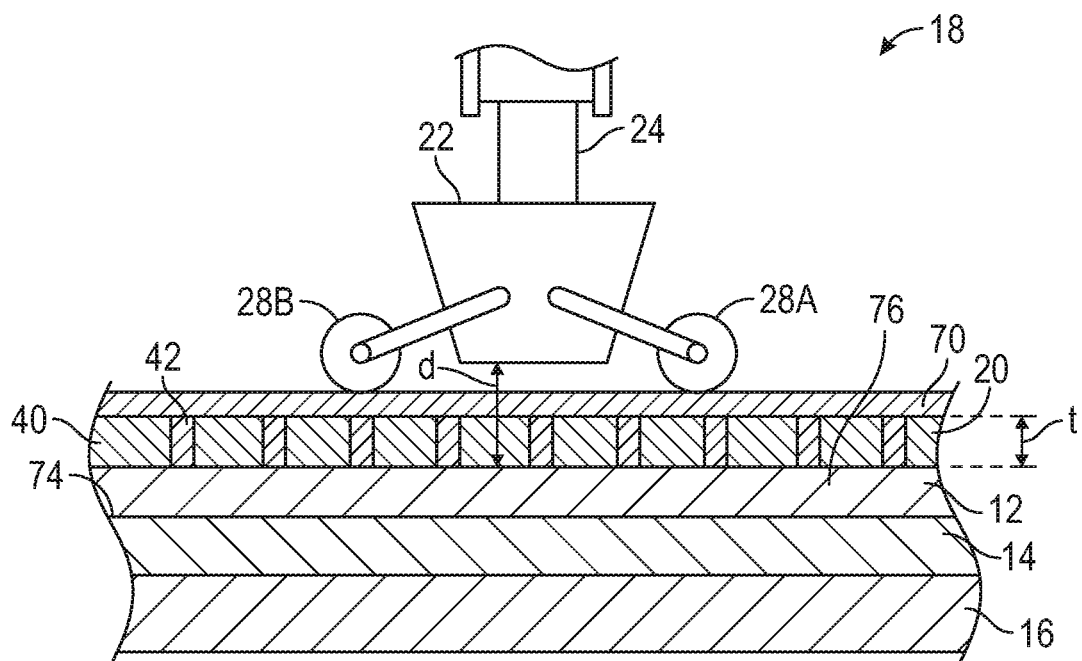
FIG. 6 is an enlarged, partial cross-section of a lay-up of the system viewed in the direction of arrows 6-6 in FIG. 1, according to an exemplary aspect.

FIG. 6 shows a cross-section of a lay-up illustrating the first TPC 12, the second TPC 14, the heat sink 20, and the vacuum bag 70 on the tooling base 16 with a side view of the induction coil 22. The first TPC 12 is disposed on top of the second TPC 14. A weld interface area 74 is defined along the weld line 26 (FIG. 1) between the first TPC 12 and the second TPC 14. The heat sink 20 is disposed on top of the first TPC 12 between the induction coil 22 and the first TPC 12. The induction coil 22 is a distance "d" from the first TPC 12. In one example, the distance d is about 8 mm. The heat sink 20 has a thickness "t" that is less than the distance d. In one example, the thickness t is about 4 mm. In yet another example, the heat sink 20 is cooled prior to being placed on the first TPC 12. The first roller 28A and the second roller 28B apply a consolidating pressure on the first TPC 12 through the vacuum bag 70 and the heat sink 20 to compress the first TPC 12 onto the second TPC 14. In one example, the first roller 28A and the second roller 28B maintain the induction coil 22 at a consistent height above the first TPC 12.

During induction welding, the controller 30 (FIG. 1) commands a current through the induction coil 22 to generate the magnetic field 25. The magnetic field 25 heats the carbon fibers within the first TPC 12 and the second TPC 14. A portion 76 of the first TPC 12 closer to the induction coil 22 is heated to a greater extent than at the weld interface area 74. However, the heat sink 20 absorbs and dissipates the heat within the portion 76 of the first TPC 12. Thus, the heat generated by the induction welder 18 is concentrated at the weld interface area 74. When the thermoplastic at the weld interface area 74 is heated above the melting point, or consolidation temperature, of the material, the first roller 28A and the second roller 28B exert a consolidating pressure on the first TPC 12 to merge the first TPC 12 with the second TPC 14 at the weld interface area 74, thus creating a uniform fusion bond upon cooling. In one example, the weld interface area 74 is heated approximately 20 degrees above the consolidation temperature. The controller 30 then commands the robotic arm 24 to move in the first direction 26A (FIG. 1) along the weld line 26 (FIG. 1) to weld the first TPC 12 part to the second TPC 14. Feedback from the sensors 38 (FIG. 1) may be used to command different currents to the induction coil 22, thus adjusting the amount of heating in real time. The heat sink 20 also allows the first TPC 12 to cool at a rate to facilitate crystallization of the semi-crystallinity thermoplastic in the weld interface area 74 after induction welding, thus increasing the amount of crystallization of the semi-crystallinity thermoplastic. For example, during induction welding the heat sink 20 absorbs heat in the tiles 40. After induction welding, the absorbed heat in the tiles 40 that is not dissipated into the atmosphere is absorbed back into the first TPC 12, thus allowing the first TPC 12 to cool at a particular rate that increases the amount of crystallization. For example, an optimum cooling rate for PEEK is in the rage of 0.2-20° F./min, which will yield a crystalline content of 25-35%. The rate of crystallization is also dependent on the specific annealing temperature with the peak rate at about the mid-point between the glass transition temperature ($T_g$) and the melting temperature ($T_m$).

Figure 7:
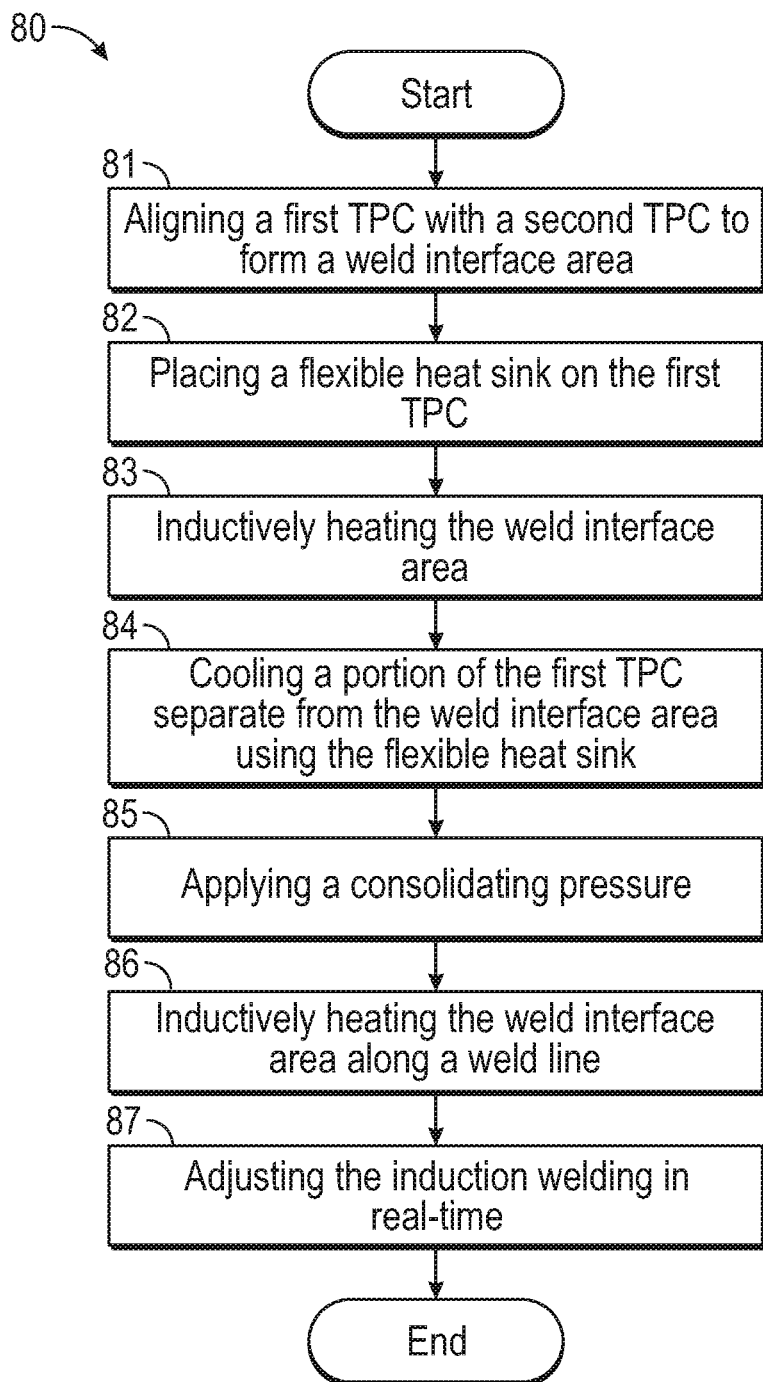
FIG. 7 is an exemplary process flow diagram illustrating a method of induction welding, according to an exemplary aspect.

With reference to FIG. 7, and continued reference to FIGS. 1 and 6, a flow chart of a method 80 for induction welding the first TPC 12 to the second TPC 14 using the system 10 is illustrated. The method 80 begins at block 81 by aligning the first TPC 12 with the second TPC 14 to form the weld interface area 74. Next, at block 82, the heat sink 20 is placed on to the first TPC 12. As noted above, the heat sink 20 preferably at least covers the weld interface area 74 along the weld line 26. Because the heat sink 20 is flexible, the heat sink 20 conforms to the surface contour of the first TPC 12, whether planar or non-planar, as illustrated in FIG. 2A. In the example provided, the first TPC 12, the second TPC 14, and the heat sink 20 are all placed within the vacuum bag 70. A vacuum may then be applied to the vacuum bag 70 by the vacuum source 72. The vacuum bag 70 applies a consolidating force of up to 1 atmosphere on the first TPC 12 and the second TPC 14. Alternatively, an inert gas may be pumped into the vacuum bag 70.

At block 83 the weld interface area 74 is inductively heated by the induction coil 22. At block 84, heat generated in the portion 76 closest to the induction coil 22 is absorbed and dissipated by the heat sink 20 thus cooling the portion 76. At block 85, the first roller 28A and the second roller 28B exert a consolidation pressure onto the first TPC 12 to merge the first TPC 12 with the second TPC 14 at the weld interface area 74, thus creating a uniform fusion bond upon cooling. It should be appreciated that blocks 83, 84, and 85 may occur simultaneously. In another example, the bellows 39 (FIG. 1A) or other means may exert a consolidating pressure onto the second TPC 14. At block 86, the weld interface area 74 is inductively welded along the weld line 26 by moving the induction coil 22 along the weld line 26 to weld the first TPC 12 part to the second TPC 14. Alternatively, the weld interface area 74 may be moved relative to the induction coil 22. At block 87, feedback from the sensors 38 is used to adjust the induction welding process in real time. For example, the controller 30 may command different currents to the induction coil 22, thus adjusting the amount of heating in real time, command a speed between the induction coil 22 and the weld interface area 74, etc.

Figure 8:
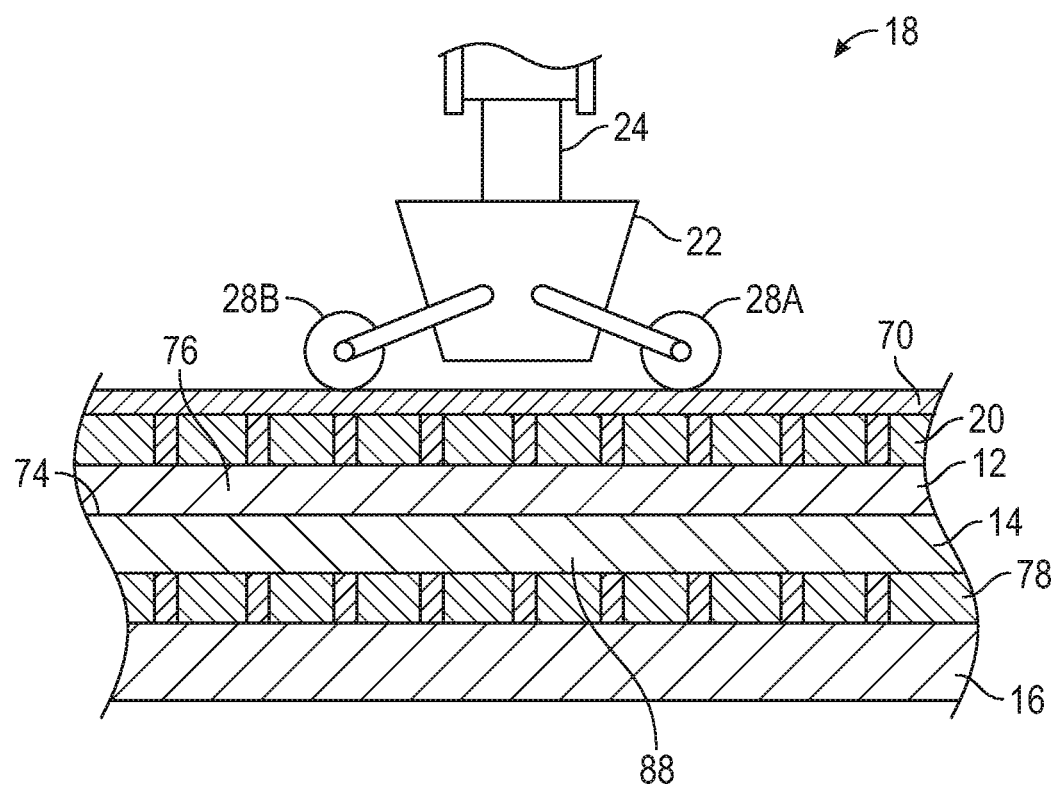
FIG. 8 is an enlarged, partial cross-section of another lay-up of the system viewed in the direction of arrows 6-6 in FIG. 1, according to an exemplary aspect.

FIG. 8 shows a cross-section of a lay-up of the first TPC 12, the second TPC 14, the heat sink 20, and the vacuum bag 70 on the tooling base 16 with a side view of the induction coil 22. However, a second heat sink 78 is included. The second heat sink 78 is substantially similar to the heat sink 20.

The first TPC 12 is disposed on top of the second TPC 14. The heat sink 20 is disposed on top of the first TPC 12 between the induction coil 22 and the first TPC 12. The second heat sink 78 is disposed between the tooling base 16 and the second TPC 14. In addition, the second heat sink 78 is disposed within the vacuum bag 70. During induction welding, as described above, it is desirable to concentrate heat at the weld interface area 74 and minimize heat in other areas of the first TPC 12 and the second TPC 14. However, during induction welding, heat is generated in the first TPC 12, the weld interface area 74, and the second TPC 14. The heat sink 20 absorbs and dissipates heat generated in portion 76 of the first TPC 12. The second heat sink 78 absorbs and dissipates heat generated in a portion 88 of the second TPC 14 adjacent the second heat sink 78. Thus, heat is concentrated along the weld interface area 74 and not in the portion 76 of the first TPC 12 and not in the portion 88 of the second TPC 14.

Figure 9:
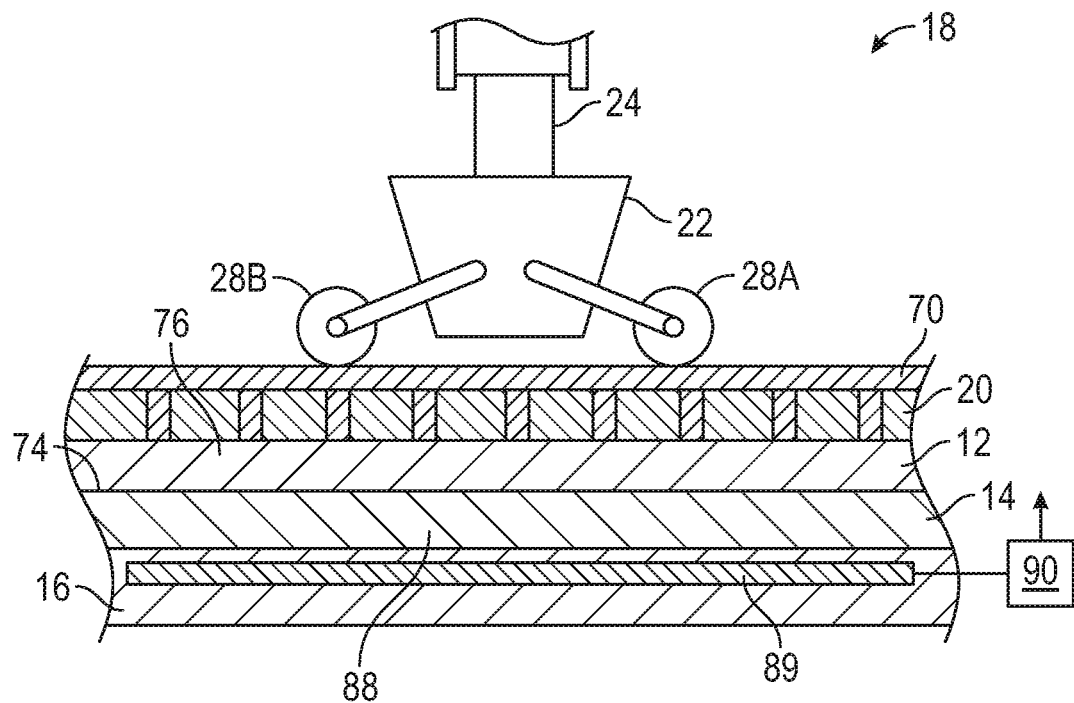
FIG. 9 is an enlarged, partial cross-section of another lay-up of the system viewed in the direction of arrows 6-6 in FIG. 1, according to an exemplary aspect.

FIG. 9 shows an enlarged cross-section of the system 10 illustrating another example of a lay-up of the first TPC 12, the second TPC 14, the heat sink 20, and the vacuum bag 70 on the tooling base 16. However, the tooling base 16 includes a cooler unit 89 embedded therein. Alternatively, the cooler unit 89 may be disposed on a surface of the tooling base 16 (not shown). The cooler unit 89 is connected to a coolant source 90. The cooler unit 89 may include tubing within the tooling base 16 and the coolant source 90 may include a fluid heat exchanger and pump (not shown). The coolant source 90 is in electrical communication with the controller 30 (FIG. 1).

The first TPC 12 is disposed on top of the second TPC 14. The heat sink 20 is disposed on top of the first TPC 12 between the induction coil 22 and the first TPC 12. The second TPC 14 is disposed adjacent the cooler unit 89 within the tooling base 16. During induction welding, as described above, it is desirable to concentrate heat at the weld interface area 74. The cooler unit 89 acts as a heat exchanger for the portion 88 of the second TPC 14 adjacent the cooler unit 89 and reduces the heat in the second TPC 14 while the heat sink 20 absorbs and dissipates heat in the first TPC 12. Thus, heat is concentrated along the weld interface area 74 and not in the portion 76 of the first TPC 12 and the portion 88 of the second TPC 14.

Figure 10:
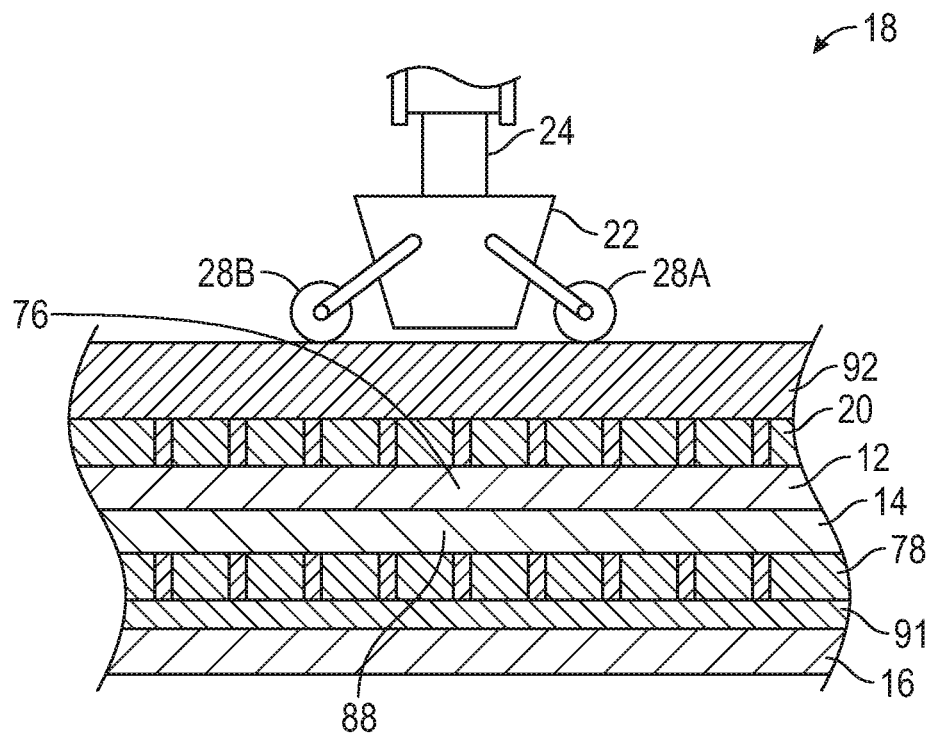
FIG. 10 is an enlarged, partial cross-section of another lay-up of the system viewed in the direction of arrows 6-6 in FIG. 1, according to an exemplary aspect.

FIG. 10 shows a cross-section of a lay-up of the first TPC 12, the second TPC 14, the heat sink 20, and the second heat sink 78 on the tooling base 16 with a side view of the induction coil 22. However, the vacuum bag 70 is replaced with a first plate 91 and a second plate 92.

The first TPC 12 is disposed on top of the second TPC 14. The heat sink 20 is disposed on top of the first TPC 12 between the induction coil 22 and the first TPC 12. The second heat sink 78 is adjacent the second TPC 14. The first TPC 12, the second TPC 14, the heat sink 20, and the second heat sink 78 are all sandwiched between the first plate 91 and the second plate 92. The first plate 91 and the second plate 92 provide stability to the lay-up by preventing the first TPC 12, the second TPC 14, the heat sink 20, and the second heat sink 78 from moving relative to one another. The first roller 28A and the second roller 28B contact the first plate 91 and provide consolidating pressure during induction welding, as described above.

Figure 11:
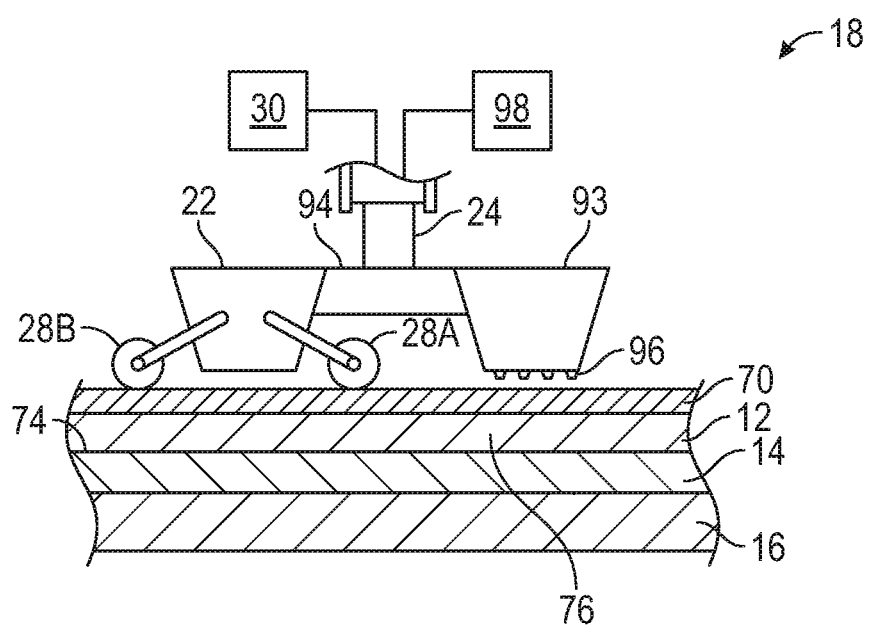
FIG. 11 is an enlarged, partial cross-section of another lay-up of the system viewed in the direction of arrows 6-6 in FIG. 1, according to an exemplary aspect.

FIG. 11 shows an enlarged, partial cross-section of the system 10 illustrating another example of a lay-up of the first TPC 12, the second TPC 14, and the vacuum bag 70 on the tooling base 16 using no heat sinks. However, the induction welder 18 includes a cooling apparatus 93. The cooling apparatus 93 is disposed adjacent the induction coil 22 in the first direction 26A (FIG. 1). The cooling apparatus 93 is connected to the induction coil 22 by a member 94 in order to fix a distance between the induction coil 22 and the cooling apparatus 93. However, it should be appreciated that the cooling apparatus 93 may be separate without departing from the scope of the present disclosure. The cooling apparatus 93 includes a number of nozzles 96 configured to emit a coolant. The cooling apparatus 93 is connected to a coolant source 98 as well as the controller 30. In one example, the coolant used is $CO_2$ gas. However, other coolants may be employed. As noted above, no heat sinks are employed in this example.

During induction welding, the cooling apparatus 93 cools the first TPC 12 ahead of the induction coil 22 by emitting the coolant onto the first TPC 12. In one example, the cooling apparatus 93 is configured to cool the first TPC 12 to about −100 degrees Fahrenheit. In this context, the term "about" is known to those skilled in the art. Alternatively, the term "about" may be read to mean plus or minus 25 degrees Fahrenheit. Cooling the first TPC 12 creates a thermal gradient and keeps the temperature of portion 76 of the first TPC 12 below the consolidation temperature during induction welding. The thermal gradient is the temperature difference at from the portion 76 of the first TPC 12 adjacent the induction coil 22 relative to the temperature at the weld interface area 74. The thermal gradient may be controlled by the number of nozzles 96, a coolant flow rate from the nozzles 96, a distance from cooling apparatus 93 to the induction coil 22, and the strength of the magnetic field generated by the induction coil 22, as well as thicknesses of the first TPC 12 and second TPC 14 and carbon fiber orientation. In addition, the amount of cooling and heating can be adjusted by the controller 30 in real-time based on feedback received from the sensors 38 (FIG. 1).

Figure 12:
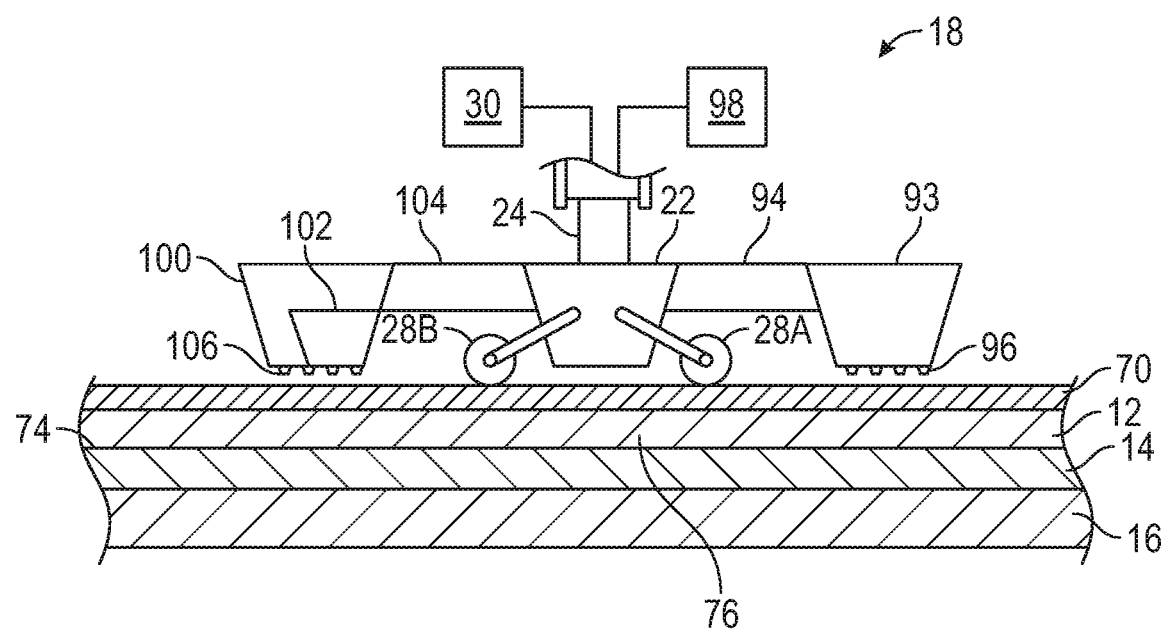
FIG. 12 is an enlarged, partial cross-section of another lay-up of the system viewed in the direction of arrows 6-6 in FIG. 1, according to an exemplary aspect.

FIG. 12 shows a cross-section of a lay-up of the first TPC 12, the second TPC 14, the vacuum bag 70 on the tooling base 16 using no heat sinks with a side view of the induction coil 22. However, the induction welder 18 includes a second cooling apparatus 100 and a second induction coil 102. The second cooling apparatus 100 and the second induction coil 102 are both disposed adjacent the induction coil 22 in a direction opposite the first direction 26A (FIG. 1). Thus, the second cooling apparatus 100 and the second induction coil 102 are disposed opposite the cooling apparatus 93. The second cooling apparatus 100 and the second induction coil 102 are connected to the induction coil 22 by a member 104 in order to fix a distance between the induction coil 22 and the second cooling apparatus 100 and the second induction coil 102. However, it should be appreciated that the second cooling apparatus 100 and/or the second induction coil 102 may be separate without departing from the scope of the present disclosure. The second cooling apparatus 100 includes a number of nozzles 106 configured to emit the coolant. The second cooling apparatus 100 is connected to the coolant source 98 as well as the controller 30. The second induction coil 102 is similar to the induction coil 22 and is controlled by the controller 30. As noted above, no heat sinks are employed in this example.

During induction welding, the cooling apparatus 93 cools the first TPC 12 ahead of the induction coil 22 by emitting the coolant onto the first TPC 12, as described above. As the induction welder 18 moves along the weld line 26 (FIG. 1), the induction coil 22 melts the weld interface area 74 and the first TPC 12 merges with the second TPC 14 under the consolidating pressure from the first roller 28A and the second roller 28B. In order to control a cooling of the weld interface area 74, the controller 30 heats and cools the merged weld interface area 74 using the second cooling apparatus 100 and the second induction coil 102. The rate of cooling at the weld interface area 74 is controlled by controlling the amount of cooling and heating by the controller 30 in real-time based on feedback received from the sensors 38 (FIG. 1). The rate of cooling can be controlled to maximize crystallization of the thermoplastic at the weld interface area 74, thus increasing strength.

Figure 13:
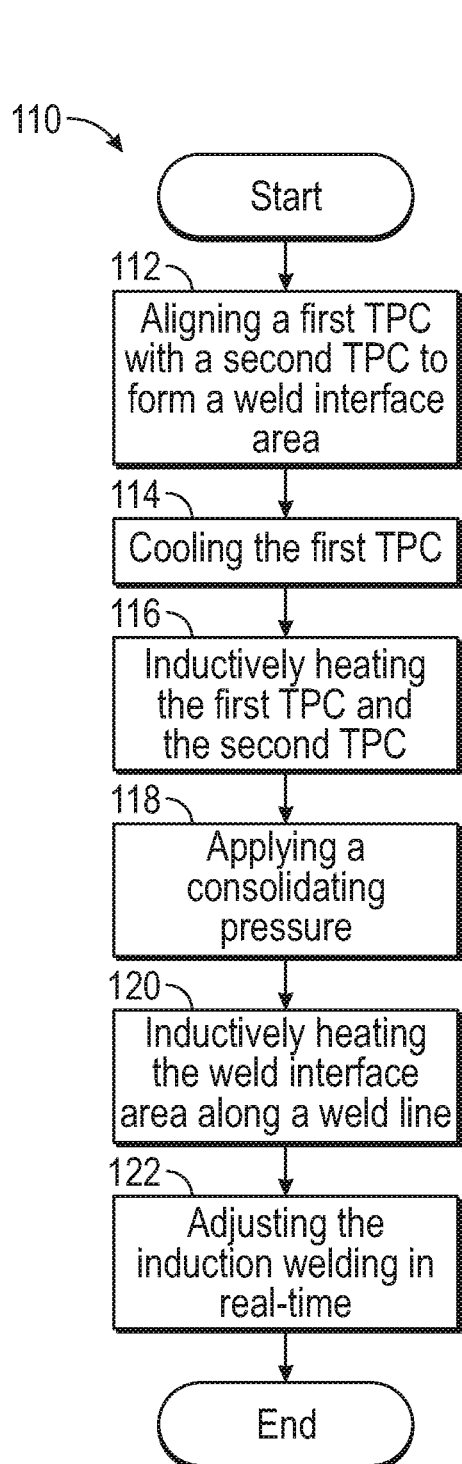
FIG. 13 is an exemplary process flow diagram of induction welding, according to an exemplary aspect.

With reference to FIG. 13, and continued reference to FIGS. 1 and 11, a flow chart of a method 110 for induction welding the first TPC 12 to the second TPC 14 using the system 10 with the cooling apparatus 93 is shown. The method 110 begins at block 112 by aligning the first TPC 12 with the second TPC 14 to form the weld interface area 74. In the example provided, the first TPC 12 and the second TPC 14 are all placed within the vacuum bag 70. A vacuum may then be applied to the vacuum bag 70 by the vacuum source 72. Alternatively, an inert gas may be pumped into the vacuum bag 70.

Next, at block 114, the first TPC 12 is cooled using the cooling apparatus 93. In one example, a target temperature at the weld interface area 74 or at the portion 76 is set by the controller 30. The controller 30 then monitors an actual temperature of the weld interface area 74 or at the portion 76 during cooling by the cooling apparatus 93 using the sensors 38. The controller 30 then controls the amount of cooling provided by the cooling apparatus 93 to match the actual temperature with the target temperature. The target temperature may be set using a look-up table or calculated given particular factors in order to achieve a particular thermal gradient. For example, setting the target temperature may determine a location of the weld interface area 74 relative to the induction coil 22 and setting the target temperature based on the location of the weld interface area 74. Other factors may include the number of nozzles 96, a coolant flow rate from the nozzles 96, a distance from cooling apparatus 93 to the induction coil 22, and the strength of the magnetic field generated by the induction coil 22, as well as thicknesses of the first TPC 12 and second TPC 14 and carbon fiber orientation, and a speed at which the induction coil 22 moves relative to the weld interface area 74 or the speed at which the weld interface area 74 moves relative to the induction coil 22, or both. In another example, the target temperature is set to about −100 degrees Fahrenheit. In this context, the term "about" is known to those skilled in the art. Alternatively, the term "about" may be read to mean plus or minus 25 degrees Fahrenheit.

At block 116 the weld interface area 74 is inductively heated by the induction coil 22. The thermal gradient created by first cooling the first TPC 12 keeps the temperature of the portion 76 closest to the induction coil 22 below the consolidation temperature while allowing the temperature of the weld interface area 74 to exceed the consolidation temperature.

At block 118, the first roller 28A and the second roller 28B exert a consolidation pressure onto the first TPC 12 to merge the first TPC 12 with the second TPC 14 at the weld interface area 74, thus creating a uniform fusion bond upon cooling. In another example, the bellows 39 (FIG. 1A) or other means may exert a consolidating pressure onto the second TPC 14. At block 120, the weld interface area 74 is inductively welded along the weld line 26 by moving the induction coil 22 along the weld line 26 to weld the first TPC 12 part to the second TPC 14. Alternatively, the weld interface area 74 may be moved relative to the induction coil 22. It should be appreciated that blocks 116, 118, and 120 may occur simultaneously. At block 122, feedback from the sensors 38 is used to adjust the induction welding process in real time. For example, the controller 30 may command different currents to the induction coil 22, thus adjusting the amount of heating in real time, command a speed between the induction coil 22 and the weld interface area 74, etc.

Figure 14:
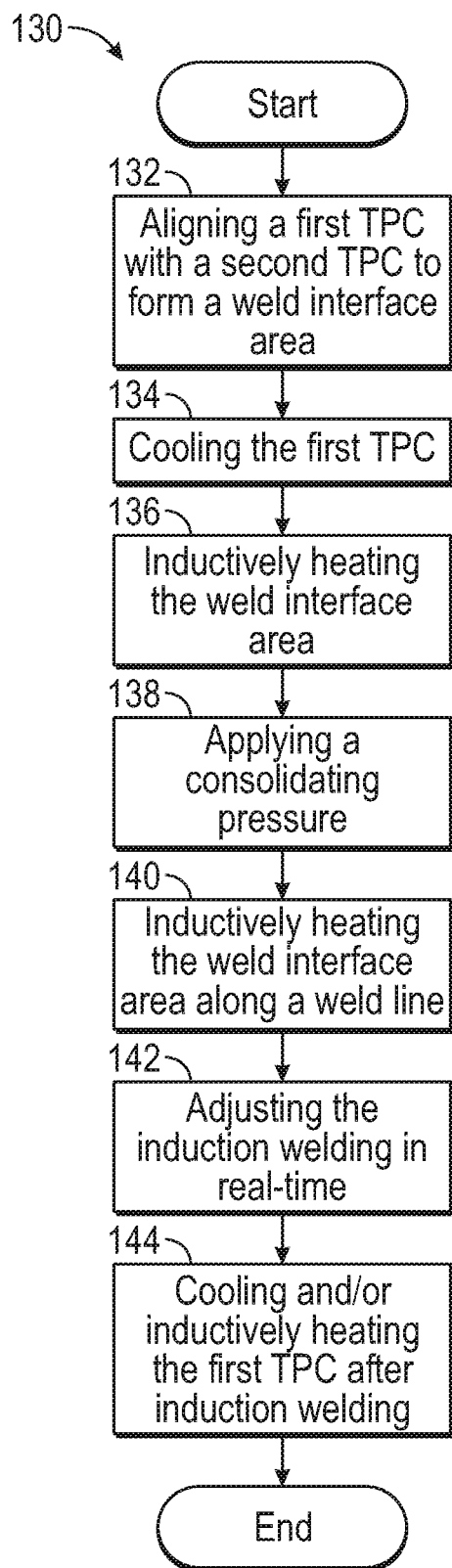
FIG. 14 is another exemplary process flow diagram of induction welding, according to an exemplary aspect.

With reference to FIG. 14, and continued reference to FIGS. 1 and 12, a flow chart of a method 130 for induction welding the first TPC 12 to the second TPC 14 using the system 10 with the cooling apparatus 93, the second cooling apparatus 100, and the second induction coil 102 is shown. The method 130 begins at block 132 by aligning the first TPC 12 with the second TPC 14 to form the weld interface area 74. In the example provided, the first TPC 12 and the second TPC 14 are all placed within the vacuum bag 70. A vacuum may then be applied to the vacuum bag 70 by the vacuum source 72. Alternatively, an inert gas may be pumped into the vacuum bag 70.

Next, at block 134, the first TPC 12 is cooled using the cooling apparatus 93. In one example, a target temperature for the first TPC 12 at the weld interface area 74 or the portion 76 is set by the controller 30. The controller 30 then monitors an actual temperature of the first TPC 12 at the weld interface area 74 or the portion 76 during cooling by the cooling apparatus 93 using the sensors 38. The controller 30 then controls the amount of cooling provided by the cooling apparatus 93 to match the actual temperature with the target temperature. The target temperature may be set using a look-up table or calculated given particular factors in order to achieve a particular thermal gradient. For example, setting the target temperature may determining a location of the weld interface area 74 relative to the induction coil 22 and setting the target temperature based on the location of the weld interface area 74. Other factors may include the number of nozzles 96, a coolant flow rate from the nozzles 96, a distance from cooling apparatus 93 to the induction coil 22, and the strength of the magnetic field generated by the induction coil 22, as well as thicknesses of the first TPC 12 and second TPC 14 and carbon fiber orientation and speed of the induction coil 22 relative to the weld interface area 74. In another example, the target temperature is set to about −100 degrees Fahrenheit. In this context, the term "about" is known to those skilled in the art. Alternatively, the term "about" may be read to mean plus or minus 25 degrees Fahrenheit.

At block 136 the weld interface area 74 is inductively heated by the induction coil 22. The thermal gradient created by first cooling the first TPC 12 keeps the temperature of the portion 76 closest to the induction coil 22 below the consolidation temperature while allowing the temperature of the weld interface area 74 to exceed the consolidation temperature.

At block 138, the first roller 28A and the second roller 28B exert a consolidation pressure onto the first TPC 12 to merge the first TPC 12 with the second TPC 14 at the weld interface area 74, thus creating a uniform fusion bond upon cooling. In another example, the bellows 39 (FIG. 1A) or other means may exert a consolidating pressure onto the second TPC 14. At block 140, the weld interface area 74 is inductively welded along the weld line 26 by moving the induction coil 22 along the weld line 26 to weld the first TPC 12 part to the second TPC 14. Alternatively, the weld interface area 74 may be moved relative to the induction coil 22. It should be appreciated that blocks 136, 138, and 140 may occur simultaneously. At block 142, feedback from the sensors 38 is used to adjust the induction welding process in real time. For example, the controller 30 may command different currents to the induction coil 22, thus adjusting the amount of heating in real time, command a speed between the induction coil 22 and the weld interface area 74, etc. At block 144 the second cooling apparatus 100 and/or the second induction coil 102 is used to control a rate of cooling of the weld interface area 74. The rate of cooling at the weld interface area 74 is controlled by controlling the amount of cooling and heating by the controller 30 in real-time based on feedback received from the sensors 38 (FIG. 1).

Figure 15:
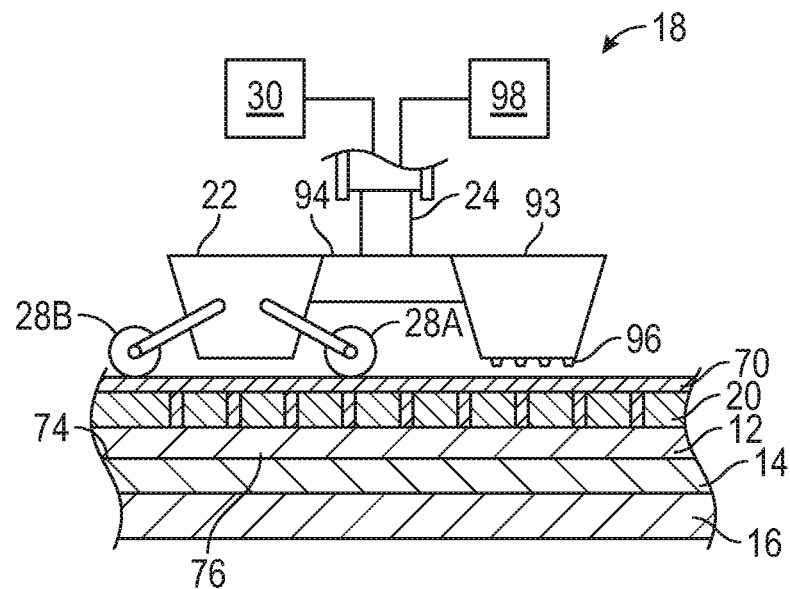
FIG. 15 is an enlarged, partial cross-section of another lay-up of the system viewed in the direction of arrows 6-6 in FIG. 1, according to an exemplary aspect.

FIG. 15 shows a cross-section of a lay-up of the first TPC 12, the second TPC 14, and the vacuum bag 70 on the tooling base 16 using the heat sink 20 with a side view of the induction coil 22 and the cooling apparatus 93. In this example, the cooling apparatus 93 cools the heat sink 20 instead of directly cooling the first TPC 12. Cooling the heat sink 20 increases the thermal gradient and allows the heat sink 20 to remove more heat from the first TPC 12 during induction welding than without cooling. In another example (not shown), the second heat sink 78 may be used in addition to the heat sink 20.

Figure 16:
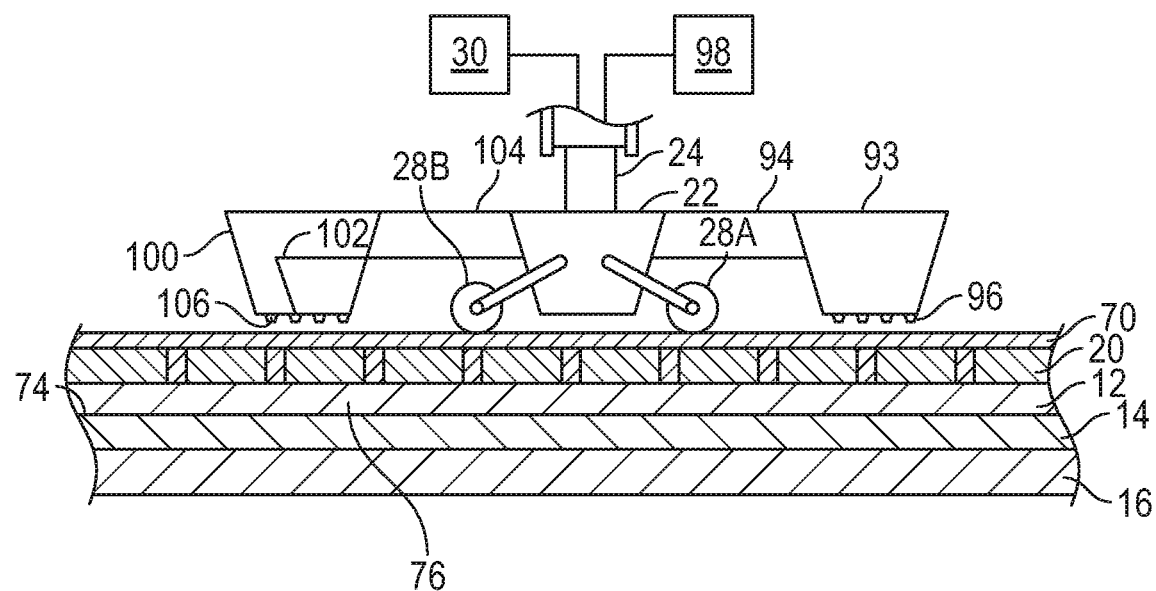
FIG. 16 is an enlarged, partial cross-section of another lay-up of the system viewed in the direction of arrows 6-6 in FIG. 1, according to an exemplary aspect.

FIG. 16 shows a cross-section of a lay-up of the first TPC 12, the second TPC 14, and the vacuum bag 70 on the tooling base 16 using the heat sink 20 with a side view of the cooling apparatus 93, the second cooling apparatus 100, and the second induction coil 102. In this example, the second cooling apparatus 100 cools the heat sink 20 instead of the directly cooling the first TPC 12 after induction welding by the induction coil 22. The second induction coil 102 operates as previously described as the heat sink 20 is not electrically conductive. In another example (not shown), the second heat sink 78 may be used in addition to the heat sink 20.

With reference to FIG. 17, and continued reference to FIGS. 1 and 15, a flow chart of a method 150 for induction welding the first TPC 12 to the second TPC 14 using the system 10 with the cooling apparatus 93 and the heat sink 20 is shown. The method 150 begins at block 152 by aligning the first TPC 12 with the second TPC 14 to form the weld interface area 74.

Next, at block 154 the heat sink 20 is placed on to the first TPC 12. As noted above, the heat sink 20 preferably at least covers the weld interface area 74 along the weld line 26. Because the heat sink 20 is flexible, the heat sink 20 conforms to the surface contour of the first TPC 12, whether planar or non-planar, as illustrated in FIG. 2A. In the example provided, the first TPC 12, the second TPC 14, and the heat sink 20 are all placed within the vacuum bag 70. A vacuum may then be applied to the vacuum bag 70 by the vacuum source 72. Alternatively, an inert gas may be pumped into the vacuum bag 70.

At block 156, the heat sink 20 is cooled using the cooling apparatus 93. In one example, a target temperature for the heat sink 20 is set by the controller 30. The controller 30 then monitors an actual temperature of the heat sink 20 during cooling by the cooling apparatus 93 using the sensors 38. The controller 30 then controls the amount of cooling provided by the cooling apparatus 93 to match the actual temperature with the target temperature. The target temperature may be set using a look-up table or calculated given particular factors in order to achieve a particular thermal gradient. For example, setting the target temperature may determining a location of the weld interface area 74 relative to the induction coil 22 and setting the target temperature based on the location of the weld interface area 74. Other factors may include the number of nozzles 96, a coolant flow rate from the nozzles 96, a distance from cooling apparatus 93 to the induction coil 22, and the strength of the magnetic field generated by the induction coil 22, as well as thicknesses of the first TPC 12 and second TPC 14 and carbon fiber orientation. In another example, the target temperature is set to about −100 degrees Fahrenheit. In this context, the term "about" is known to those skilled in the art. Alternatively, the term "about" may be read to mean plus or minus 25 degrees Fahrenheit.

At block 158 the weld interface area 74 is inductively heated by the induction coil 22. The heat sink 20, cooled at block 156, keeps the temperature of the portion 76 closest to the induction coil 22 below the consolidation temperature while allowing the temperature of the weld interface area 74 to exceed the consolidation temperature.

At block 160, the first roller 28A and the second roller 28B exert a consolidation pressure onto the first TPC 12 to merge the first TPC 12 with the second TPC 14 at the weld interface area 74, thus creating a uniform fusion bond upon cooling. In another example, the bellows 39 (FIG. 1A) or other means may exert a consolidating pressure onto the second TPC 14. At block 162, the weld interface area 74 is inductively welded along the weld line 26 by moving the induction coil 22 along the weld line 26 to weld the first TPC 12 part to the second TPC 14. Alternatively, the weld interface area 74 may be moved relative to the induction coil 22. It should be appreciated that blocks 158, 160, and 162 may occur simultaneously. At block 164, feedback from the sensors 38 is used to adjust the induction welding process in real time. For example, the controller 30 may command different currents to the induction coil 22, thus adjusting the amount of heating in real time, command a speed between the induction coil 22 and the weld interface area 74, etc. With reference to FIG. 18, and continued reference to FIGS. 1 and 16, a flow chart of a method 170 for induction welding the first TPC 12 to the second TPC 14 using the system 10 with the heat sink 20, the cooling apparatus 93, the second cooling apparatus 100, and the second induction coil 102 is shown. The method 170 begins at block 172 by aligning the first TPC 12 with the second TPC 14 to form the weld interface area 74.

Next, at block 174 the heat sink 20 is placed on to the first TPC 12. As noted above, the heat sink 20 preferably at least covers the weld interface area 74 along the weld line 26. Because the heat sink 20 is flexible, the heat sink 20 conforms to the surface contour of the first TPC 12, whether planar or non-planar, as illustrated in FIG. 2A. In the example provided, the first TPC 12, the second TPC 14, and the heat sink 20 are all placed within the vacuum bag 70. A vacuum may then be applied to the vacuum bag 70 by the vacuum source 72. Alternatively, an inert gas may be pumped into the vacuum bag 70.

At block 176, the heat sink 20 is cooled using the cooling apparatus 93. In one example, a target temperature for the heat sink 20 is set by the controller 30. The controller 30 then monitors an actual temperature of the heat sink 20 during cooling by the cooling apparatus 93 using the sensors 38. The controller 30 then controls the amount of cooling provided by the cooling apparatus 93 to match the actual temperature with the target temperature. The target temperature may be set using a look-up table or calculated given particular factors in order to achieve a particular thermal gradient. For example, setting the target temperature may determining a location of the weld interface area 74 relative to the induction coil 22 and setting the target temperature based on the location of the weld interface area 74. Other factors may include the number of nozzles 96, a coolant flow rate from the nozzles 96, a distance from cooling apparatus 93 to the induction coil 22, and the strength of the magnetic field generated by the induction coil 22, as well as thicknesses of the first TPC 12 and second TPC 14, carbon fiber orientation, and speed of movement of the induction coil 22 relative to the weld interface area 74. In another example, the target temperature is set to about −100 degrees Fahrenheit. In this context, the term "about" is known to those skilled in the art. Alternatively, the term "about" may be read to mean plus or minus 25 degrees Fahrenheit.

At block 178 the weld interface area 74 is inductively heated by the induction coil 22. The heat sink 20, cooled at block 176, keeps the temperature of the portion 76 closest to the induction coil 22 below the consolidation temperature while allowing the temperature of the weld interface area 74 to exceed the consolidation temperature.

At block 179, the first roller 28A and the second roller 28B exert a consolidation pressure onto the first TPC 12 to merge the first TPC 12 with the second TPC 14 at the weld interface area 74, thus creating a uniform fusion bond upon cooling. In another example, the bellows 39 (FIG. 1A) or other means may exert a consolidating pressure onto the second TPC 14. At block 180, the weld interface area 74 is inductively welded along the weld line 26 by moving the induction coil 22 along the weld line 26 to weld the first TPC 12 part to the second TPC 14. Alternatively, the weld interface area 74 may be moved relative to the induction coil 22. It should be appreciated that blocks 178, 179, and 180 may occur simultaneously. At block 182, feedback from the sensors 38 is used to adjust the induction welding process in real time. For example, the controller 30 may command different currents to the induction coil 22, thus adjusting the amount of heating in real time, command a speed between the induction coil 22 and the weld interface area 74, etc. At block 184 the second cooling apparatus 100 and/or the second induction coil 102 is used to control a rate of cooling of the weld interface area 74. The rate of cooling at the weld interface area 74 is controlled by controlling the amount of cooling and heating by the controller 30 in real-time based on feedback received from the sensors 38 (FIG. 1).

Figure 19:
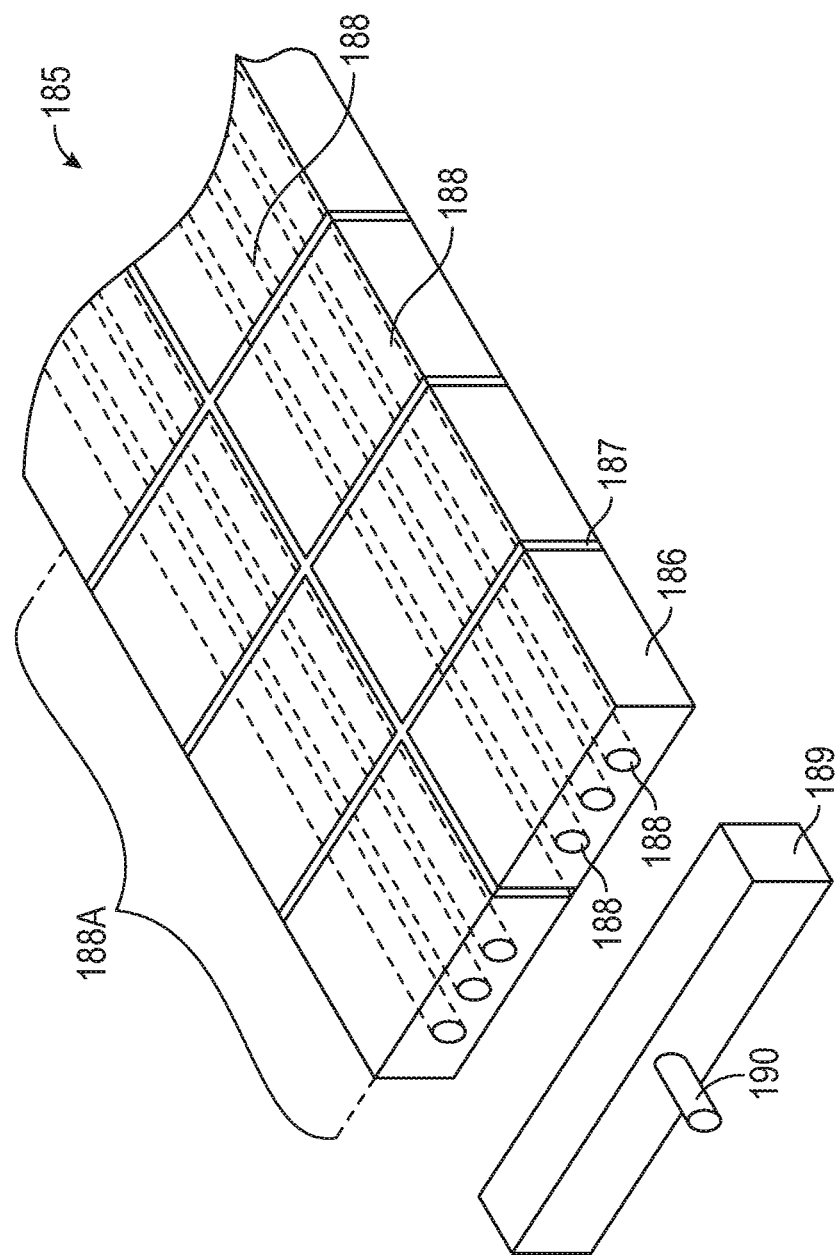
FIG. 19 is a perspective view of another example of a heat sink with liquid cooling, according to an exemplary aspect.

FIG. 19 shows an alternate example of a heat sink 185 according to the principles of the present disclosure. The heat sink 185 is configured to absorb and dissipate heat from the first TPC 12 and/or the second TPC 14. The heat sink 185 includes a number of tiles 186 flexibly connected by a joint 187. The joint 187 is disposed between the tiles 186. The tiles 186 are substantially similar to the tiles 40 and the joint 187 is substantially similar to the joint 42 of the heat sink 20 shown in FIG. 2. However, the heat sink 185 further includes a number of fluid channels 188 formed therethrough. The fluid channels 188 extend through each of the tiles 186 and through each of the joints 187. Sets of fluid channels 188 between adjacent tiles 186 and the joints 187 are connected together in series to form number of fluid paths 188A through the heat sink 185. The fluid paths 188A are preferably unidirectional and parallel to one another. However, the fluid paths 188A may have other configurations, such as non-parallel or offset. In the example provided, each tile 186 includes three fluid channels 188, however, it should be appreciated that any number of fluid channels 188 may be employed. The fluid channels 188 are sized to communicate a coolant fluid there through, as will be described below. In one example, the fluid channels 188 have a diameter of about 0.042 inches. In another example, the fluid channels 188 have a diameter of about 0.082 inches. In one aspect, a manifold 189 is connected to the heat sink 185. The manifold 189 includes a port 190 that communicates via multiple internal channels (not shown) with the fluid channels 188 in order to provide a single connection port for the heat sink 185.

Figure 20:
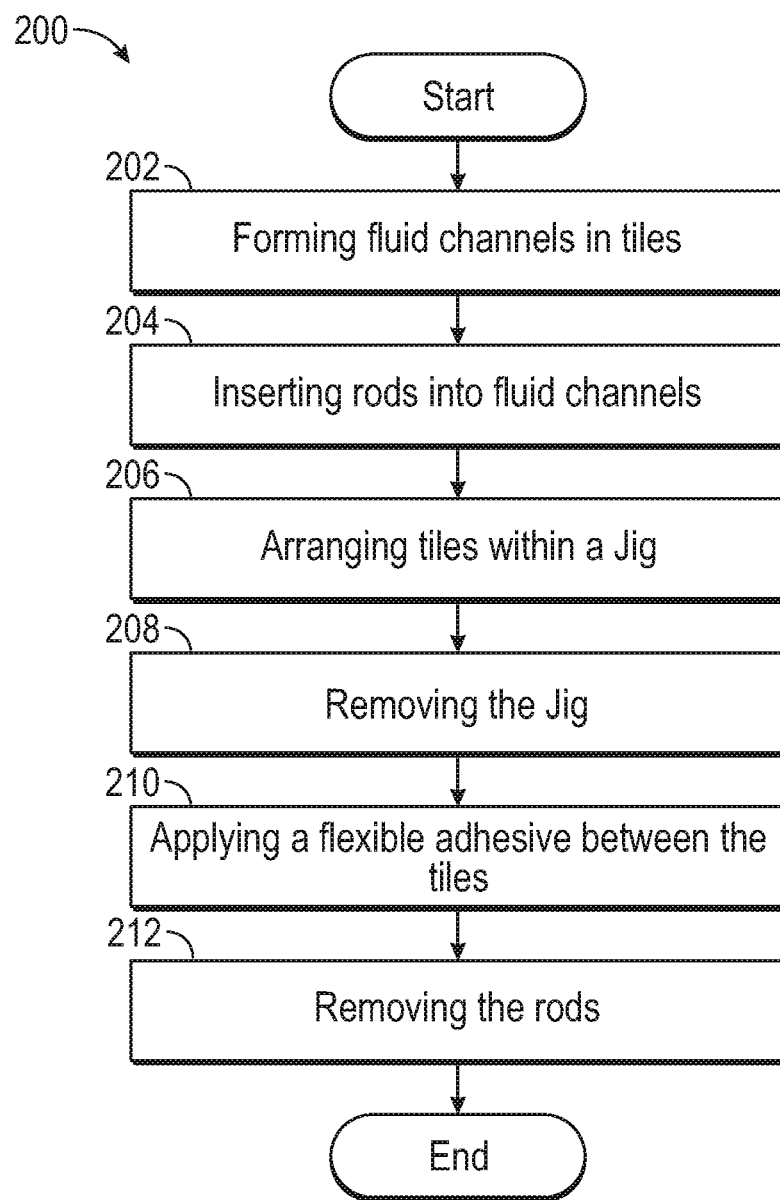
FIG. 20 is an exemplary process flow diagram illustrating a method of fabricating the heat sink with liquid cooling of FIG. 19 using the heat sink fabrication system of FIG. 3, according to an exemplary aspect.

FIG. 20 shows a flow chart of a method 200 for creating the heat sink 185 using the heat sink fabrication system 50 of FIG. 3. The method 200 begins at block 202 where the fluid channels 188 are formed through each of the tiles 186. In one example, the fluid channels 188 are drilled through the tiles 186 using ultra-sonic machining (not shown).

Figure 21:
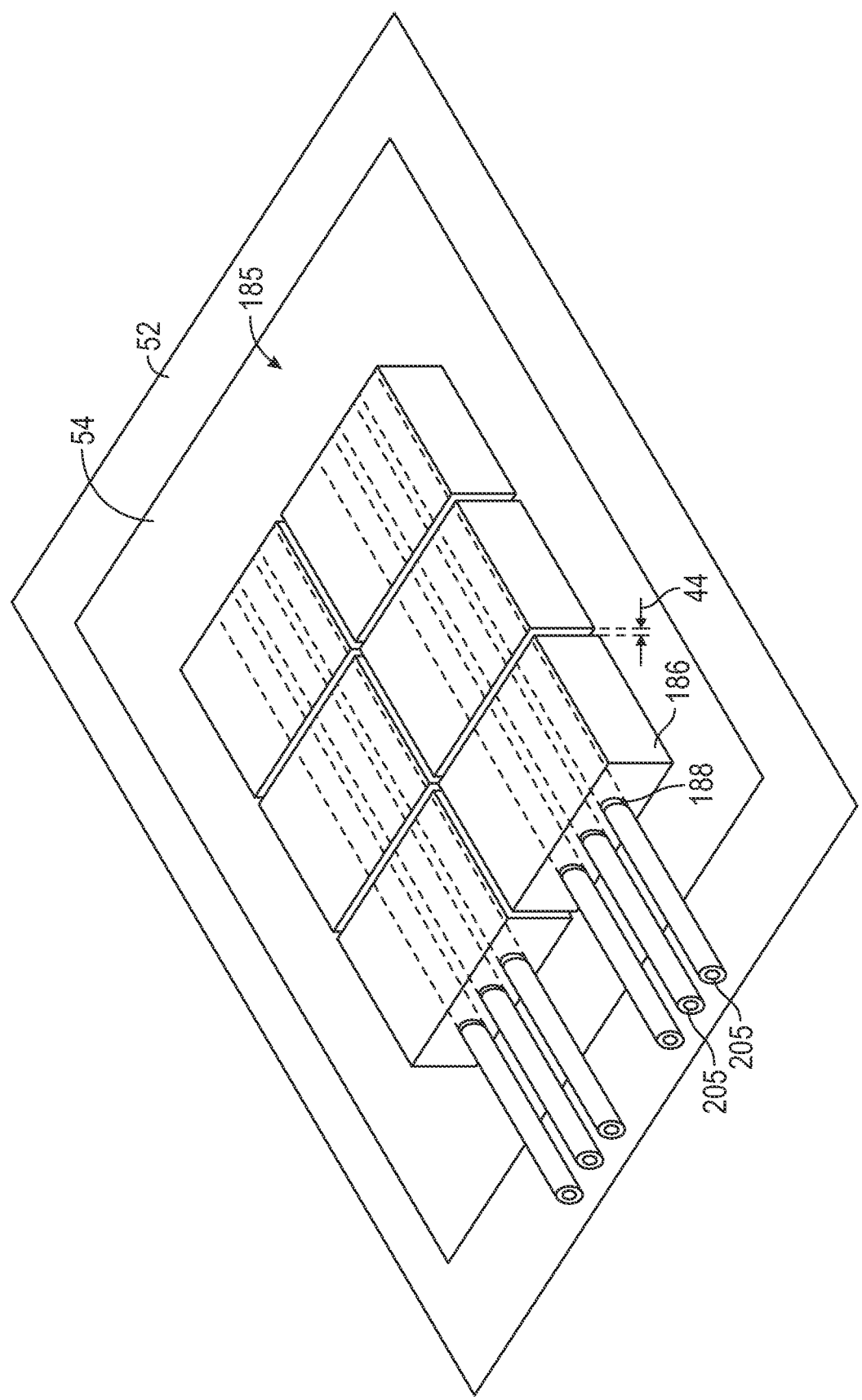
FIG. 21 is a perspective view of the heat sink fabrication system used to fabricate the heat sink with liquid cooling of FIG. 19, according to an exemplary aspect.

At block 204 a plurality of rods 205, illustrated in FIG. 21, are inserted into the fluid channels 188. The rods 193 may be coated with a release material to assist in later removing the rods 193. The rods 193 are sized to match the diameters of the fluid channels 188. Each of the rods 193 passes through multiple tiles 186 having aligned fluid channels 188. At block 206 the tiles 186 are arranged into a pattern. For example, the tiles 186 are placed onto the backing material 54 between the jig 58. The backing material 54 holds the tiles 186 in place while the jig 58 spaces the tiles 186. Thus, the pattern is defined by the jig 58. The tiles 186 may be primed by a primer prior to arrangement onto the backing material 54. The tiles 186 are preferably arranged such that the fluid channels 188 are in alignment with one another. It should be appreciated that blocks 204 and 206 may be performed in any order without departing form the scope of the present disclosure.

At block 208 the frame 56 and the jig 58 are removed thus leaving the gaps 44 between the tiles 186. Next, at bock 210, the tiles 40 are flexibly joined together with the flexible adhesive 45. The flexible adhesive 45 is applied within the gaps 44 between the tiles 186. The rods 205 prevent the flexible adhesive 45 from entering the fluid channels 188 formed in the tiles 186. In addition, the flexible adhesive 45 flows around the rods 205 to form the fluid channels 188 through the joint 187. The flexible adhesive 45 is then preferably cured over a period of time. Once cured, at block 212 the rods 193 are removed from the fluid channels 188. The assembled heat sink 185 may be removed from the backing material 54.

Figure 22:
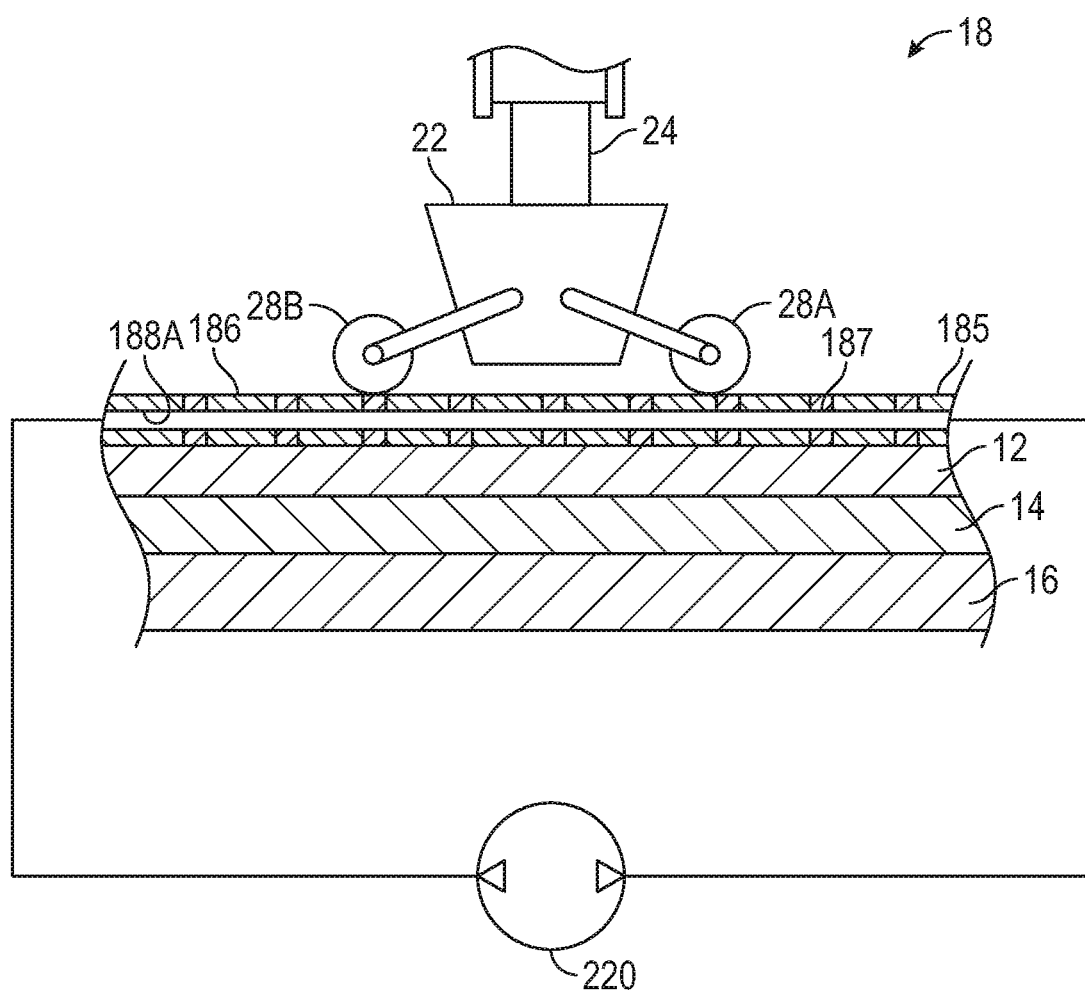
FIG. 22 is an enlarged cross-section of another lay-up of the system viewed in the direction of arrows 6-6 in FIG. 1 using the heat sink with liquid cooling, according to an exemplary aspect.

FIG. 22 shows an enlarged, partial cross-section of the system 10 illustrating a lay-up of the first TPC 12, the second TPC 14, and the heat sink 185 on the tooling base 16. The first TPC 12 is disposed on top of the second TPC 14. The heat sink 185 is disposed on top of the first TPC 12 between the induction coil 22 and the first TPC 12. The first roller 28A and the second roller 28B apply a consolidating pressure on the first TPC 12 through the heat sink 185 to compress the first TPC 12 onto the second TPC 14. The fluid paths 188A of the heat sink 185 are connected to a pump 220 that supplies a coolant to the heat sink 185. The pump 220 is configured to pump a coolant, such as water or a high temperature transfer fluid, through the fluid paths 188A of the heat sink 185. An example of a high temperature transfer fluid is Dynalene SF by Dynalene. In one example, the pump 220 is connected to the port 190 (FIG. 19) of the manifold 189.

During induction welding, the controller 30 (FIG. 1) commands a current through the induction coil 22 to generate the magnetic field 25. The magnetic field 25 heats the carbon fibers within the first TPC 12 and the second TPC 14. A portion 76 of the first TPC 12 closer to the induction coil 22 is heated to a greater extent than at the weld interface area 74. A coolant is pumped through the heat sink 185 by the pump 220. Heat generated in the first TPC 12 is absorbed by the heat sink 185 and dissipated into the coolant in the fluid paths 188A. The coolant is pumped out of the heat sink 185, thus dissipating the heat in the first TPC 12.

When the thermoplastic at the weld interface area 74 is heated above the melting point, or consolidation temperature, of the material, the first roller 28A and the second roller 28B exert a consolidating pressure on the first TPC 12 to merge the first TPC 12 with the second TPC 14 at the weld interface area 74, thus creating a uniform fusion bond upon cooling. In one example, the weld interface area 74 is heated approximately 20 degrees above the consolidation temperature.

Once heated, the coolant may be pumped back through the heat sink 185 to control a rate of cooling of the weld interface area 74. In one example, the coolant is cycled back through the heat sink 185 at a temperature of about 400 degrees Fahrenheit after induction welding to control a rate of cooling of the weld interface area 74. The input temperature and flow rate of the coolant through the heat sink 185, along with the power supplied to the induction coil 22, may be adjusted to control the cooling rate of the weld interface area 74.

The controller 30 then commands the robotic arm 24 to move in the first direction 26A (FIG. 1) along the weld line 26 (FIG. 1) to weld the first TPC 12 part to the second TPC 14. Alternatively, the weld interface area 74 is moved relative to the induction coil 22. Feedback from the sensors 38 (FIG. 1) may be used to command different currents to the induction coil 22, thus adjusting the amount of heating in real time.

Figure 23:
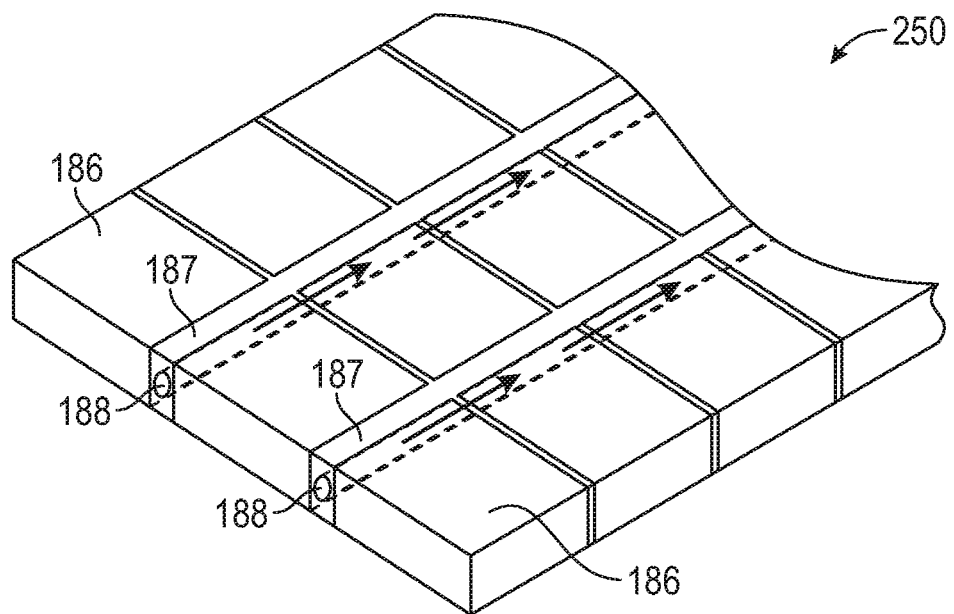
FIG. 23 is a perspective view of another example of a heat sink with liquid cooling, according to an exemplary aspect.

FIG. 23 shows another example of a heat sink 250 according to the principles of the present disclosure. The heat sink 250 is similar to the heat sink 185 shown in FIG. 19, however, the fluid channels 188 are disposed within the joints 187. Thus, the fluid channels 188 are disposed between the tiles 186 rather than through the tiles 186. The tiles 186 are not drilled therethrough and therefore can withstand greater compressive force than in the heat sink 185. The fluid channels 188 are able to withstand the consolidating pressure during induction welding without pinching and cutting off the fluid channels 188.

Figure 24:
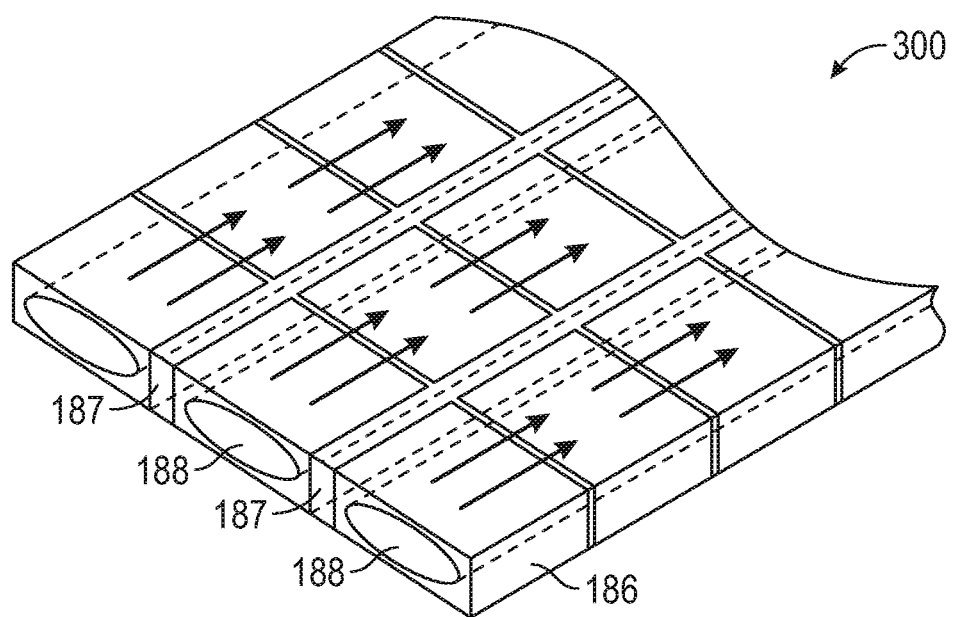
FIG. 24 is a perspective view of another example of a heat sink with liquid cooling, according to an exemplary aspect.

FIG. 24 shows still another example of a heat sink 300 according to the principles of the present disclosure. The heat sink 250 is similar to the heat sink 185 shown in FIG. 19, however, the fluid channels 188 are oval in shape. In addition, only one fluid channel 188 is formed in each of the tiles 186. The oval shaped fluid channels 188 reduce the pressure drop and reduce any chance of restrictions within the fluid channel 188, relative to the heat sink 185. Additionally, the oval shaped fluid channels 188 have increased thermal transfer due to larger surface areas of the fluid channel 188, relative to the heat sink 185. It should be appreciated that other shapes, including square or star, may be employed without departing from the scope of the present disclosure.

Figure 25:
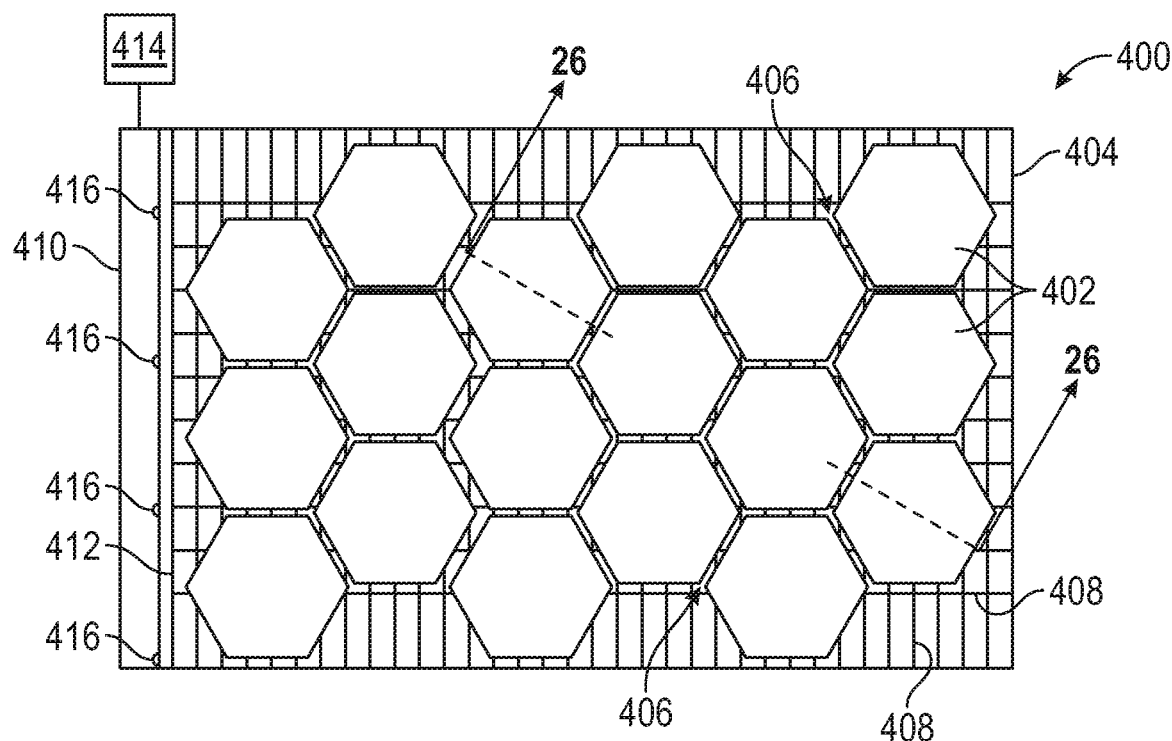
FIG. 25 is a top view of another example of a heat sink used during induction welding, according to an exemplary aspect.

FIG. 25 shows a top view of a portion of another example of a heat sink 400 according to the principles of the present disclosure. The heat sink 400 includes a number of tiles 402 connected by a backing 404. The tiles 402 are made from an electrically non-conductive and thermally conductive material and are similar to the tiles 40 (FIG. 2) of the heat sink 20, however, the tiles 402 are hexagonal in shape rather than square. However, it should be appreciated that the tiles 402 may have any number of sides and shapes without departing from the scope of the present disclosure. The tiles 402 are fixed in place by the backing 404.

The backing 404 flexibly holds the tiles 402 together and provides flexibility to the heat sink 400, thus allowing the heat sink 400 to conform to a curved surface (not shown). The tiles 402 are arranged in a single layer in a parquet or geometric pattern. Each of the tiles 402 define an air gap 406 therebetween. The air gap 406 is free of material. In one example, the air gap 406 has a width 407 between about 0.005 inches to about 0.1 inches and preferably about 0.040 inches. In this context, the term "about" is known to those skilled in the art. Alternatively, the term "about" may be read to mean plus or minus 0.005 inches. The air gap 406 allows for increased cooling of the tiles 402 using air flow, as will be described below. The backing 404 is preferably a mesh comprised of interleaved fibers 408, only a few of which are illustrated in FIG. 25. The fibers 408 are non-conductive and do not melt during induction welding. The fibers 408 may be comprised of glass or an oxide ceramic and may be embedded in a silicone or other material. In another example, the backing 404 is comprised of a fiberglass cloth or mesh infused with Polytetrafluoroethylene (PTFE).

In one example, the heat sink 400 includes a tube 410 disposed along a longitudinal edge 412 of the heat sink 400. In one example, the tube 410 is bonded to the backing 404. In another example, the tube 410 is comprised of PTFE. In addition, or alternatively, the tube 410 may be disposed in a portion of the heat sink 400 not along the longitudinal edge 412, such as a lateral edge, etc. The tube 410 is connected with a source of pressurized gas 414. The source of pressurized gas 414 may include a fan, pump, or pressurized tank. The source of pressurized gas 414 communicates a gas, such as air or cold $CO_2$, through the tube 410. The tube 410 includes holes 416 disposed therethrough. The holes 416 are aligned with the air gaps 406 between the tiles 402. During induction welding, gas is provided by the source of pressurized gas 414 and communicated through the tube 410 and through the holes 416. The gas then passes through the air gaps 406 and absorbs and dissipates heat from the tiles 402.

Figure 26:
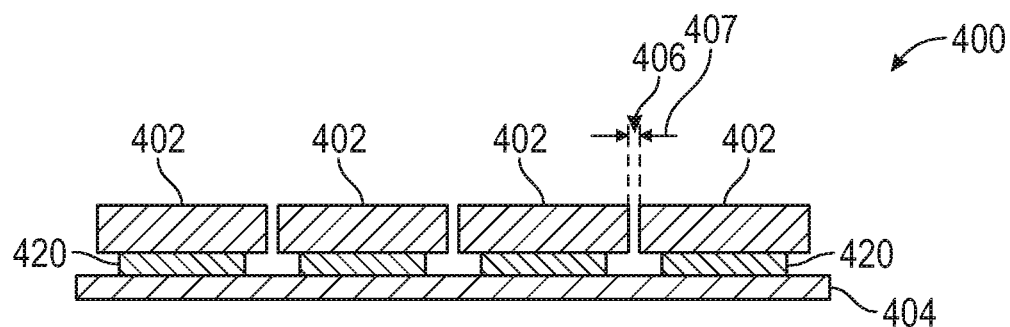
FIG. 26 is a cross-section view of the heat sink viewed in the direction of arrows 26-26 in FIG. 25, according to an exemplary aspect.
Figure 27:
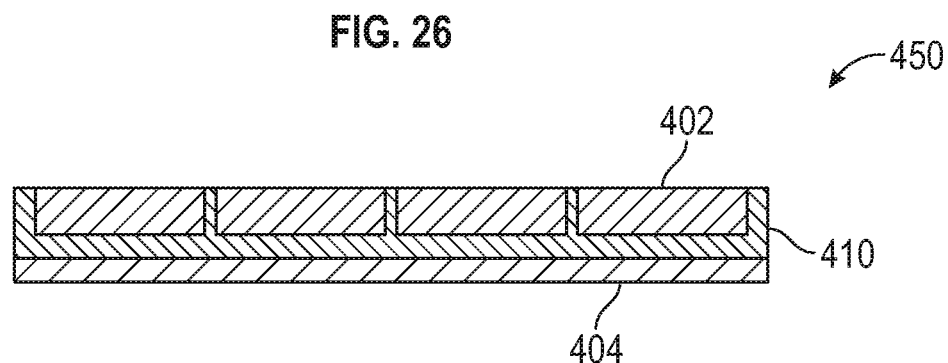
FIG. 27 is a cross-section view of a variation of the heat sink shown in FIG. 25, according to an exemplary aspect.

FIG. 26 shows a partial cross-section of the heat sink 400. The tiles 402 are adhered to the backing 404 by an adhesive 420. The adhesive 420 does not need to be flexible since the backing 404 is flexible. Examples of suitable adhesives include Silicones, PTFE, Polybenzimidazole (PBI), High-performance polyamides (HPPAs), Polyamide (PIs), Polyamidemides (PAIS), Polyketones, Polysulfone derivatives-a, Flouropolymers, Polyethermides (PEIs), Polybutylene terephthalates (PB Ts), Polyphenylene sulfides, Syndiotactic polystyrene, and Polycyclohexane dimethyl-terephthalates (PCTs). Another example of a suitable adhesive is an epoxy, heat cured, two component system having a liquid resin and powder hardener. For example, the adhesive may be EPDXYLITE® 5403 or EPDXYLITE® 5302 registered to Elantas PDG, Inc. In another example, the adhesive 420 may be a silicone pressure sensitive adhesive. In another example, the adhesive 420 is comprised of the same type of silicone used in the joint 42 (FIG. 2) of the heat sink 20. FIG. 27 shows a cross-section of another variation of the heat sink 450 where the tiles 402 are embedded within the adhesive 420. In this example, the air gaps 406 are filled with the adhesive 420.

Figure 28:
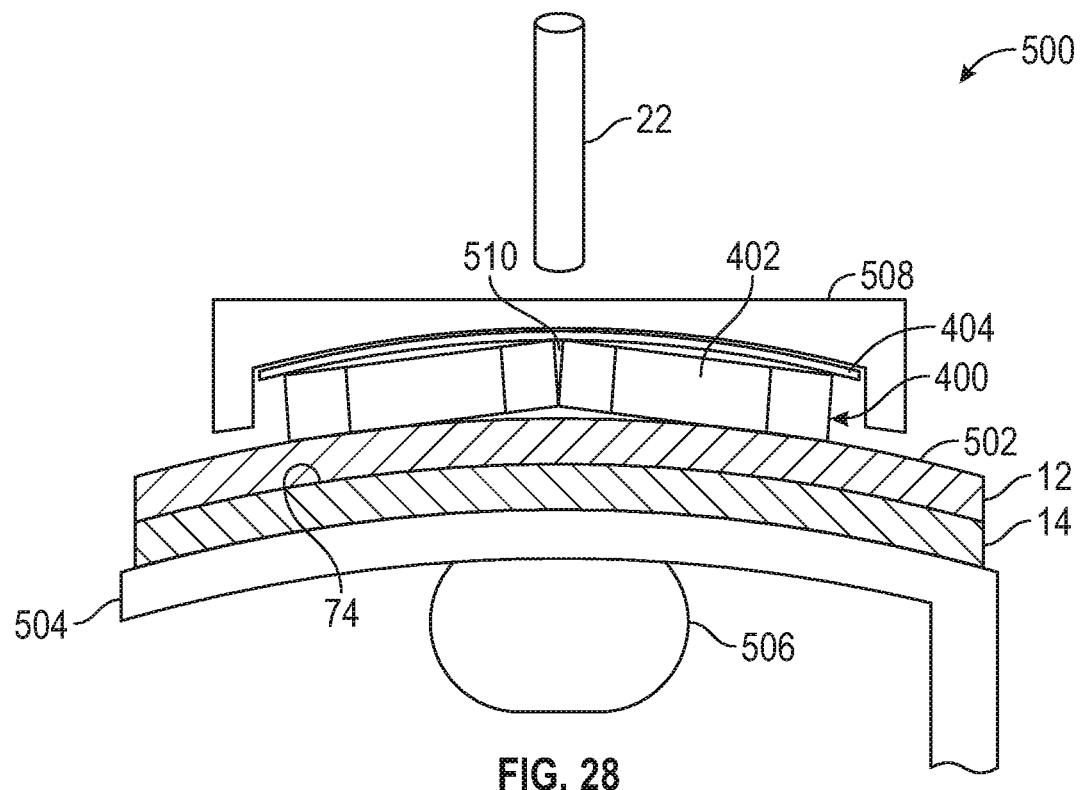
FIG. 28 is a schematic view of a system for induction welding using the heat sink shown in FIG. 25, according to an exemplary aspect.
Figure 29:
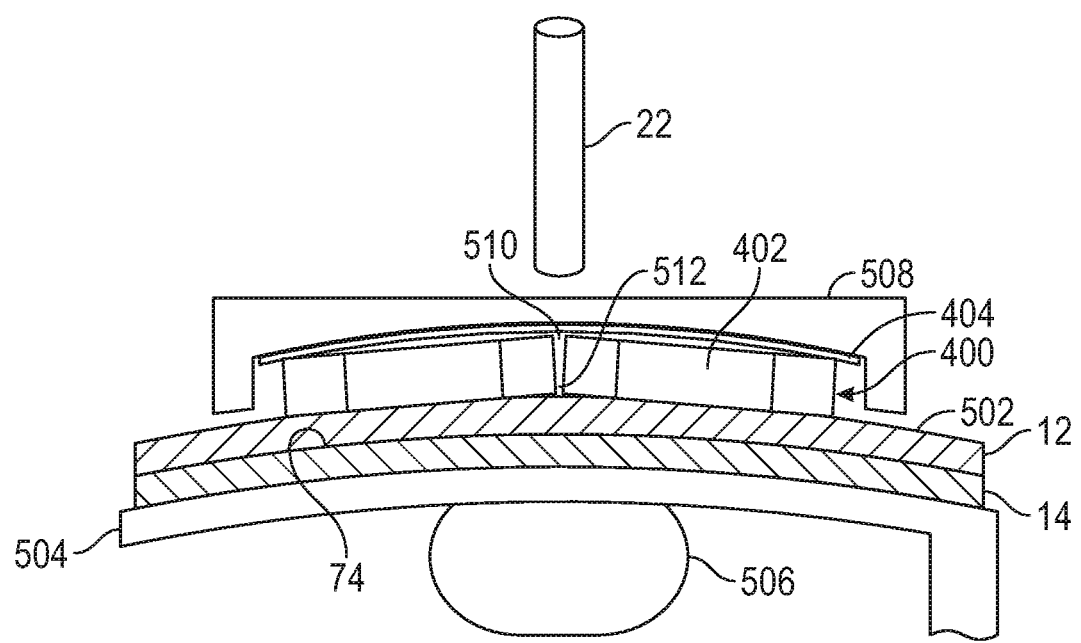
FIG. 29 is a schematic view of the system for induction welding using the heat sink shown in FIG. 25, according to another exemplary aspect.

FIGS. 28 and 29 illustrate a partial cross-section of a system 500 for induction welding the first TPC 12 to the second TPC 14 using the heat sink 400. The system 500 operates in a manner similar to the system 10 (FIG. 1) described above. In the example provide, the first TPC 12 and the second TPC 14 are curved and thus the first TPC 12 defines a curved contact surface 502. The first TPC 12 and the second TPC 14 are supported by a curved tooling base 504. Consolidating pressure during induction welding is applied through the curved tooling base 504 by a bellows 506. Alternatively, air pressure cylinders or mechanical actuators, such as springs, straps, or levers, may be used to apply the consolidating pressure.

The heat sink 400 is disposed on the first TPC 12 between the induction coil 22 and the second TPC 14. The backing 404 flexes to allow the tiles 402 to contact the curved contact surface 502. Contact between the tiles 402 and the curved contact surface 502 maximizes heat transfer. In another example (not shown), the backing 404 is infused with PTFE and the backing 404 is in contact with the curved contact surface 502. The PTFE allows the backing 404 to act as a release film and prevents the heat sink 400 from sticking to the first TPC 12 during induction welding.

The heat sink 400 is held in place by a heat sink holder 508. Alternatively, or in addition, the vacuum bag 70 (FIG. 1) may be used to hold the heat sink 400 in contact with the curved contact surface 502. In one example, shown in FIG. 28, an air gap 510 is formed opposite the weld interface area 74 only when the backing 404 is flexed. In this example, air flow is not used to help cool the tiles 402 and the heat sink may only accommodate a curved surface in two dimensions (i.e., x and y coordinates). In another example, shown in FIG. 29, an air gap 512 is also formed adjacent the curved contact surface 502 when the backing 404 is flexed. In this example, air flow is used through the air gaps 510, 512 to help cool the tiles 402. Additionally, the heat sink 400 may accommodate a curved surface in three dimensions (i.e., x, y, and z coordinates). Induction welding is performed in a manner similar to that described above in reference to FIG. 1.

The systems 10 and 500 described above, the heat sinks 20, 185, 250, 300, and 400, as well as the methods 60, 80, 110, 130, 150, and 170 all operate to control the inductive heating of the first TPC 12 and the second TPC 14 to concentrate heating along the weld interface area 74. Thus, temperatures exceeding the consolidation temperature are avoided in the portion 76 in the first TPC 12 closest the induction coil 22 as well as the portion 88 in the second TPC 14.

Figure 30:
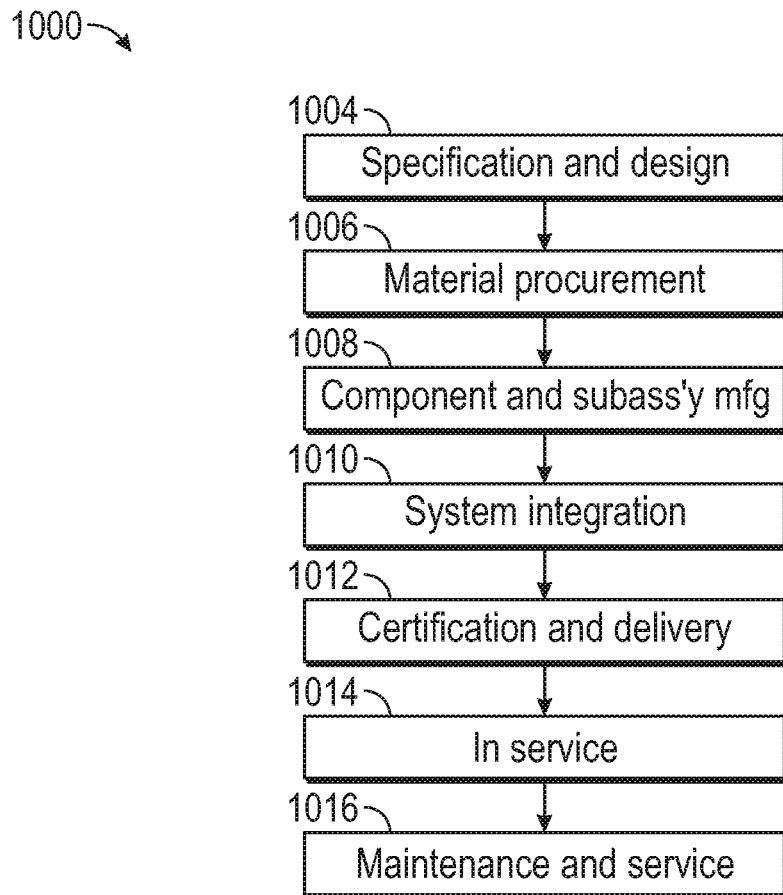
FIG. 30 is a flow diagram of aircraft production and service methodology.
Figure 31:
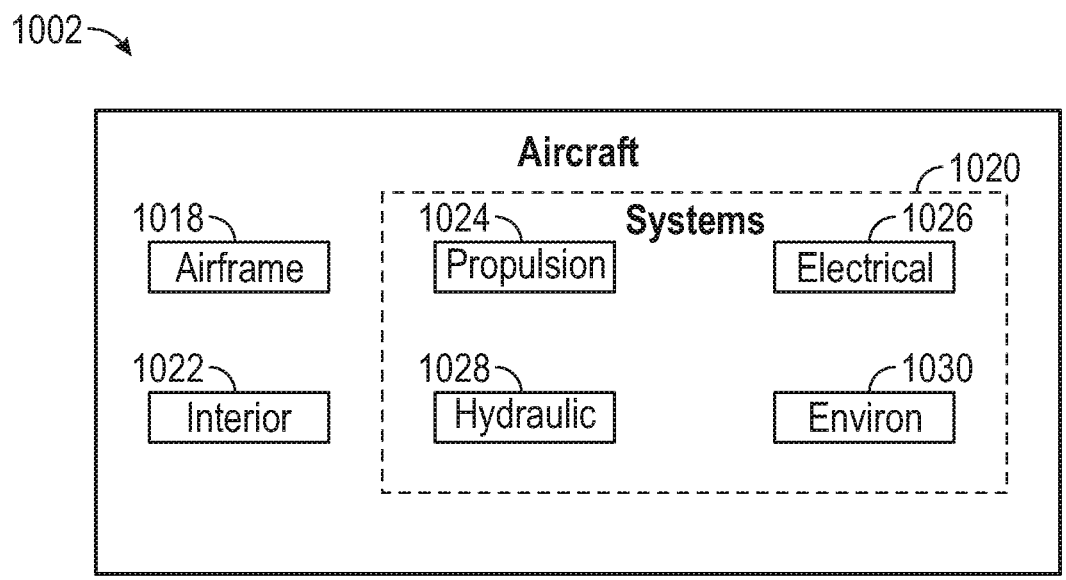
FIG. 31 is a block diagram of an aircraft.

Aspects of the systems 10 and 500, as well as the methods 60, 80, 110, 130, 150, and 170, may be employed in the context of an aircraft manufacturing and service method 1000 as shown in FIG. 30 and an aircraft 1002 as shown in FIG. 31. During pre-production, exemplary method 1000 may include specification and design 1004 of the aircraft 1002 and material procurement 1006. During production, component and subassembly manufacturing 1008 and system integration 1010 of the aircraft 1002 takes place. Thereafter, the aircraft 1002 may go through certification and delivery 1012 in order to be placed in service 1014. While in service by a customer, the aircraft 1002 is scheduled for routine maintenance and service 1016 (which may also include modification, reconfiguration, refurbishment, and so on). Apparatus and methods embodied herein may be employed during any one or more suitable stages of the production and service described in method 1000 (e.g., specification and design 1004, material procurement 1006, component and subassembly manufacturing 1008, system integration 1010, certification and delivery 1012, service 1014, maintenance and service 1016) and/or any suitable component of aircraft 1002 (e.g., airframe 1018, systems 1020, interior 1022, propulsion system 1024, electrical system 1026, hydraulic system 1028, environmental 1030).

Each of the processes of the systems and methods described herein may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 31, the aircraft 1002 produced by exemplary method 1000 may include an airframe 1018 with a plurality of systems 1020 and an interior 1022. Examples of systems 1020 include one or more of a propulsion system 1024, an electrical system 1026, a hydraulic system 1028, and an environmental system 1030. Any number of other systems may be included. Although an aerospace example is shown, the principles of the disclosure may be applied to other industries, such as the automotive industry.

The system and methods described above may be employed during any one or more of the stages of the exemplary method 1000. For example, components or subassemblies corresponding to component and subassembly manufacturing 1008 may be fabricated or manufactured in a manner similar to components or subassemblies produced while the aircraft 1002 is in service. Also, one or more apparatus aspects, method aspects, or a combination thereof may be utilized during the component and subassembly manufacturing 1008 and system integration 1010, for example, by substantially expediting assembly of or reducing the cost of an aircraft 1002. Similarly, one or more of apparatus aspects, method aspects, or a combination thereof may be utilized while the aircraft 1002 is in service, for example and without limitation, to maintenance and service 1016. For example, the techniques and systems described herein may be used for material procurement 1006, component and subassembly manufacturing 208, system integration 1010, service 1014, and/or maintenance and service 1016, and/or may be used for airframe 1018 and/or interior 1022. These techniques and systems may even be utilized for systems 1020, including, for example, propulsion system 1024, electrical system 1026, hydraulic 1028, and/or environmental system1030.

The description of the present disclosure is merely exemplary in nature and variations that do not depart from the gist of the present disclosure are intended to be within the scope of the present disclosure. Such variations are not to be regarded as a departure from the spirit and scope of the present disclosure.

The following is claimed:

1. A method of dissipating heat from a surface of a first thermoplastic composite (TPC) being inductively welded with a second thermoplastic composite (TPC), the method comprising:
   aligning the first TPC with the second TPC to form a weld interface area between the first TPC and the second TPC;
   placing a heat sink on the surface of the first TPC and flexing the heat sink during placement to conform to the surface of the first TPC, wherein the heat sink covers the weld interface area;
   cooling the heat sink prior to inductively heating the weld interface area;
   applying inductive heat to the weld interface area between the first TPC and the second TPC; and
   drawing off heat via the heat sink from the surface of the first TPC.

2. The method of claim 1, further comprising applying inductive heat to the weld interface area along a weld line.

3. The method of claim 2, wherein cooling the heat sink includes moving a cooling apparatus along the weld line to cool the heat sink prior to inductively heating the weld interface area.

4. The method of claim 1, wherein flexing the heat sink during placement includes aligning the heat sink with the weld interface area along a weld line.

5. The method of claim 1, further comprising flexing a second heat sink during placement to conform to a surface of the second TPC.

6. The method of claim 5, wherein placing the second heat sink on the second TPC includes aligning the second heat sink with the weld interface area along a weld line.

7. The method of claim 5, further comprising drawing off heat via the second heat sink from the surface of the second TPC.

8. The method of claim 1, wherein flexing the heat sink includes flexing a joint between a number of thermally conductive and electrically non-conductive tiles.

9. The method of claim 1, further comprising setting a target temperature, and wherein cooling the heat sink prior to inductively heating the weld interface area includes cooling the heat sink to the target temperature.

10. The method of claim 9, further comprising monitoring an actual temperature of the heat sink.

11. The method of claim 10, wherein cooling the heat sink prior to inductively heating the weld interface area includes cooling the heat sink to the target temperature based on the actual temperature of the heat sink.

12. The method of claim 9, wherein setting a target temperature includes:
   determining a location of the heat sink relative to the weld interface area and relative to an induction coil; and
   setting the target temperature based on the location of the heat sink.

13. The method of claim 9, wherein the target temperature is about −100 degrees Fahrenheit.

14. The method of claim 1, further comprising compressing together the first TPC and the second TPC while inductively heating the weld interface area.

15. The method of claim 1, further comprising:
   inserting the first TPC and the second TPC within a vacuum bag; and
   vacuum compressing the first TPC to the second TPC during or after inductively heating the weld interface area.

16. The method of claim 1, further comprising cooling the heat sink after inductively heating the weld interface area.

17. The method of claim 16, further comprising inductively heating the first TPC using a second inductive coil after inductively heating the weld interface area using a first induction coil.

18. The method of claim 17, further comprising:
   sensing a temperature of the weld interface area after inductively heating the weld interface area using the first induction coil; and
   cooling the heat sink or inductively heating the first TPC using the second induction coil to control a rate of cooling of the first TPC.

19. A system for dissipating heat from a surface of a first thermoplastic composite (TPC) as the first TPC is inductively welded to a second thermoplastic composite (TPC), the system comprising:
   a heat sink disposed on and flexibly conforming to the surface of the first TPC, the heat sink having a number of tiles flexibly joined together by a joint, wherein the heat sink covers a weld interface area formed between the first TPC aligned with the second TPC;

an induction coil disposed above the heat sink and moveable relative to the weld interface area in a first direction to apply inductive heat to the weld interface area and form a weld at the weld interface area between the first TPC with the second TPC, wherein the heat sink draws off heat from the surface of the first TPC; and a cooling apparatus disposed above the heat sink for cooling the heat sink, the cooling apparatus disposed adjacent the induction coil in the first direction, the cooling apparatus moveable in the first direction to cool the heat sink prior to inductively heating the weld interface area and forming the weld.

20. The system of claim 19, further comprising a vacuum bag, wherein the first TPC, the second TPC, and the heat sink are disposed within the vacuum bag.

21. The system of claim 20, further comprising a second heat sink disposed on the second TPC.

22. The system of claim 21, wherein the second heat sink is disposed within the vacuum bag.

23. The system of claim 19, further comprising a tool disposed opposite the induction coil, the tool having a cooler unit disposed within the tool, the cooler unit adjacent the second TPC.

24. The system of claim 19, wherein the cooling apparatus is connected to the induction coil at a fixed distance from the induction coil.

25. The system of claim 19, wherein the cooling apparatus includes a number of nozzles connected with a source of coolant.

26. The system of claim 25, wherein the source of coolant includes $CO_2$.

27. The system of claim 19, further comprising a controller in electronic communication with the induction coil and the cooling apparatus, the controller configured to control movement of the induction coil and the cooling apparatus and a flow rate of a coolant from the cooling apparatus.

28. The system of claim 27, further comprising a sensor for sensing a temperature of the heat sink, the sensor in electronic communication with the controller.

29. The system of claim 28, wherein the controller controls the movement of the induction coil and the cooling apparatus and the flow rate of the coolant based on feedback from the sensor to control a rate of cooling of the first TPC.

30. The system of claim 19, further comprising a second cooling apparatus disposed adjacent the induction coil in a second direction opposite the first direction, the second cooling apparatus configured to cool the heat sink after induction heating the weld interface area with the induction coil.

31. The system of claim 30, wherein the second cooling apparatus is coupled to the induction coil at a fixed distance from the induction coil.

32. The system of claim 30, further comprising a second induction coil disposed adjacent the induction coil in the second direction, the second induction coil configured to heat the first TPC after induction heating the weld interface area with the induction coil.

33. The system of claim 32, wherein the second induction coil is coupled to the induction coil at a fixed distance from the induction coil.

34. A method of dissipating heat from a surface of a first thermoplastic composite (TPC) being inductively welded with a second thermoplastic composite (TPC), the method comprising:

aligning the first TPC with the second TPC to form a weld interface area between the first TPC and the second TPC placing a heat sink on the surface of the first TPC and flexing the heat sink to conform to the surface of the first TPC, wherein the heat sink covers the weld interface area;

cooling the heat sink before inductively heating the weld interface area;

applying inductive heat to the weld interface area between the first TPC and the second TPC;

drawing off heat via the heat sink from the surface of the first TPC; and cooling the heat sink after inductively heating.

\* \* \* \* \*